US008977322B2

(12) United States Patent
Oba et al.

(10) Patent No.: US 8,977,322 B2
(45) Date of Patent: *Mar. 10, 2015

(54) METHOD AND APPARATUS FOR DISPLAYING AN IMAGE OF A DEVICE BASED ON RADIO WAVES

(71) Applicant: Sony Corporation, Tokyo (JP)

(72) Inventors: Haruo Oba, Kanagawa (JP); Taku Sugawara, Tokyo (JP); Takeo Inagaki, Tokyo (JP); Junichi Rekimoto, Tokyo (JP); Nobuyuki Matsushita, Kanagawa (JP); Yuji Ayatsuka, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/254,608

(22) Filed: Apr. 16, 2014

(65) Prior Publication Data

US 2014/0225911 A1 Aug. 14, 2014

Related U.S. Application Data

(63) Continuation of application No. 13/331,685, filed on Dec. 20, 2011, now Pat. No. 8,731,619, which is a continuation of application No. 10/488,212, filed as application No. PCT/JP02/08643 on Aug. 28, 2002, now Pat. No. 8,108,005.

(30) Foreign Application Priority Data

Aug. 28, 2001 (JP) ................................. 2001-257308

(51) Int. Cl.
*H04B 1/38* (2006.01)
*H04B 17/00* (2006.01)
(Continued)

(52) U.S. Cl.
CPC .............. *H04B 17/0092* (2013.01); *G06F 3/14* (2013.01); *H04M 1/7253* (2013.01);
(Continued)

(58) Field of Classification Search
USPC ............................ 455/566, 456.1–456.6, 457
See application file for complete search history.

(56) References Cited

U.S. PATENT DOCUMENTS 4,754,268 A 6/1988 Mori
(Continued)

FOREIGN PATENT DOCUMENTS

CA 2 276 565 2/2000
(Continued)

OTHER PUBLICATIONS

European International Search Report dated Jan. 30, 2008.

*Primary Examiner* — Kiet Doan
*Assistant Examiner* — Dung Lam
(74) *Attorney, Agent, or Firm* — Finnegan, Henderson, Farabow, Garrett & Dunner, LLP

(57) ABSTRACT

The present invention relates to an information processing apparatus and method, and a program in which information can be reliably exchanged when performing wireless communication by allowing a user to know a communication distance at which devices can be connected. A communication unit 28 performs Bluetooth communication with a communication unit, which serves as a Bluetooth module, provided for a cellular telephone. A CPU 21 displays an image corresponding to the cellular telephone based on the input level of Bluetooth radio waves transmitted from the cellular telephone. For example, when the input level of the radio waves transmitted from the cellular telephone is equal to the maximum input, the CPU 21 sets the level of transparency to be 0, and displays the image corresponding to the cellular telephone on an LCD 32 so that a background image is not transmitted at all. When the input level of the radio waves is almost equal to the reception sensitivity, the CPU 21 displays the image corresponding to the cellular telephone on the LCD 32 by setting the level of transparency to be 90% so as to transmit the background image. The present invention can be applied to an information processing apparatus, for example, a personal computer, a PDA, or a cellular telephone.

18 Claims, 27 Drawing Sheets

(51) Int. Cl.
    *G06F 3/14*           (2006.01)
    *H04M 1/725*       (2006.01)
    *G06T 3/40*           (2006.01)
    *G06T 11/00*        (2006.01)
    *H04B 7/26*          (2006.01)
    *G09G 5/00*          (2006.01)
    *H04W 8/00*         (2009.01)
    *H04W 40/24*       (2009.01)
    *H04W 84/18*       (2009.01)

(52) U.S. Cl.
    CPC ............ *G06T 3/4038* (2013.01); *G06T 11/001* (2013.01); *H04B 7/26* (2013.01); *G06F 3/1423* (2013.01); *G06F 3/1454* (2013.01); *G09G 5/00* (2013.01); *H04M 2250/02* (2013.01); *H04W 8/005* (2013.01); *H04W 40/246* (2013.01); *H04W 84/18* (2013.01)
    USPC ...... 455/566; 455/457; 455/456.1; 455/456.2

(56) References Cited

U.S. PATENT DOCUMENTS

| | | | |
|---|---|---|---|
| 4,891,650 A | 1/1990 | Sheffer | |
| 4,988,981 A | 1/1991 | Zimmerman et al. | |
| 5,694,150 A | 12/1997 | Sigona et al. | |
| 5,722,059 A | 2/1998 | Campana, Jr. | |
| 5,801,680 A | 9/1998 | Minakuchi | |
| 5,822,205 A | 10/1998 | Arihara et al. | |
| 5,881,299 A | 3/1999 | Nomura et al. | |
| 5,950,139 A * | 9/1999 | Korycan | 455/566 |
| 5,974,330 A | 10/1999 | Negishi | |
| 6,069,896 A | 5/2000 | Borgstahl et al. | |
| 6,094,188 A * | 7/2000 | Horton et al. | 345/158 |
| 6,211,876 B1 | 4/2001 | Ackermann et al. | |
| 6,362,841 B1 * | 3/2002 | Nykanen | 715/835 |
| 6,393,307 B1 | 5/2002 | Kim | |
| 6,421,347 B1 | 7/2002 | Borgstahl et al. | |
| 7,328,004 B1 | 2/2008 | Wolters et al. | |
| 2001/0031637 A1 | 10/2001 | Suzuki | |
| 2002/0044152 A1 | 4/2002 | Abbott et al. | |

FOREIGN PATENT DOCUMENTS

| | | |
|---|---|---|
| CA | 2 255 054 | 5/2000 |
| EP | 0 881 605 | 12/1998 |
| EP | 0 939 531 | 9/1999 |
| EP | 0 967 557 | 12/1999 |
| EP | 1 107 512 | 6/2001 |
| JP | 09-146499 | 6/1997 |
| JP | 3074672 | 10/2000 |
| JP | 2001-145159 | 5/2001 |
| JP | 2001-145163 | 5/2001 |
| JP | 2001-223691 | 8/2001 |
| WO | WO 92/09983 | 6/1992 |
| WO | WO 98/17032 | 4/1998 |
| WO | WO 00/41073 | 7/2000 |

* cited by examiner

FIG. 17
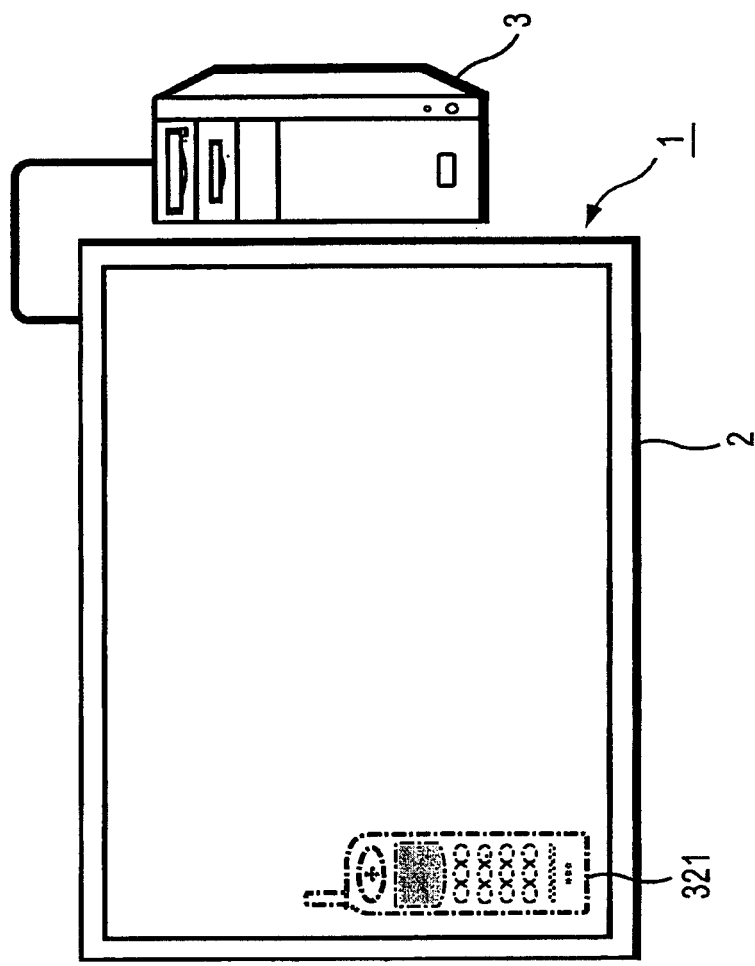
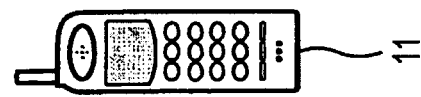

FIG. 18
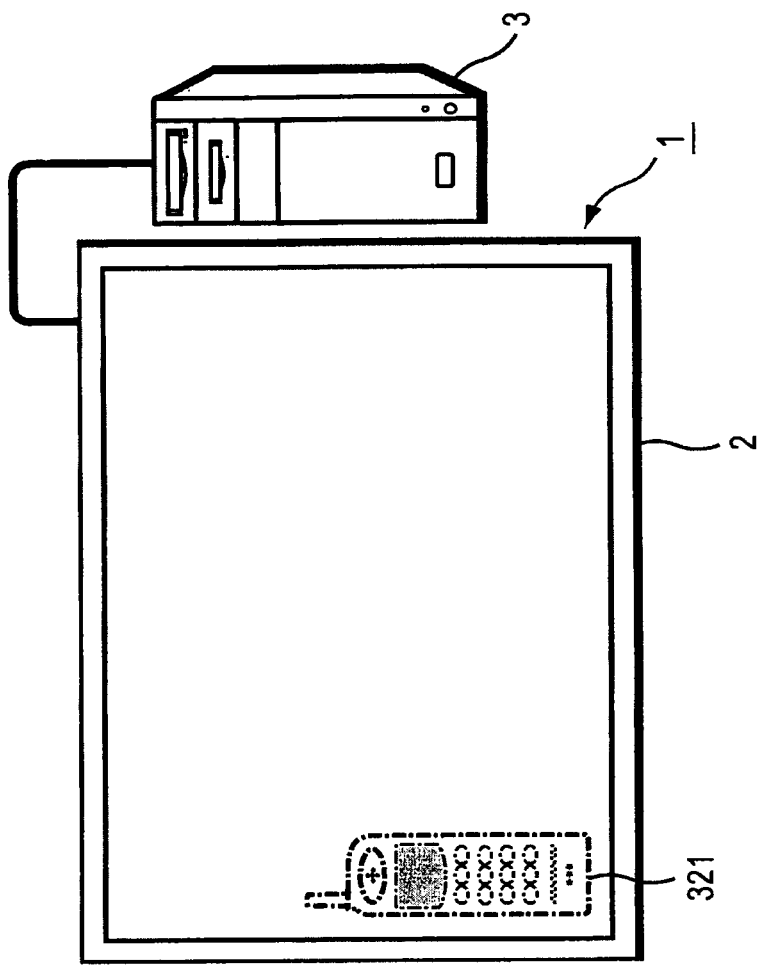
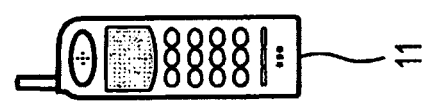

FIG. 21
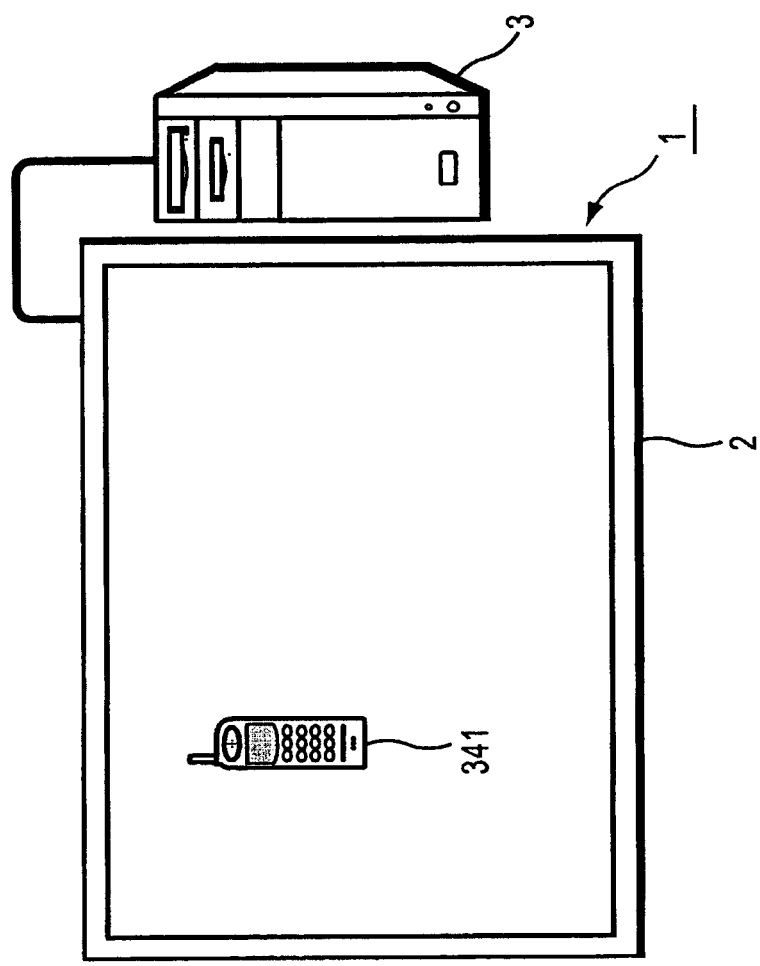
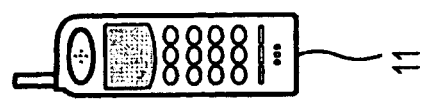

FIG. 22
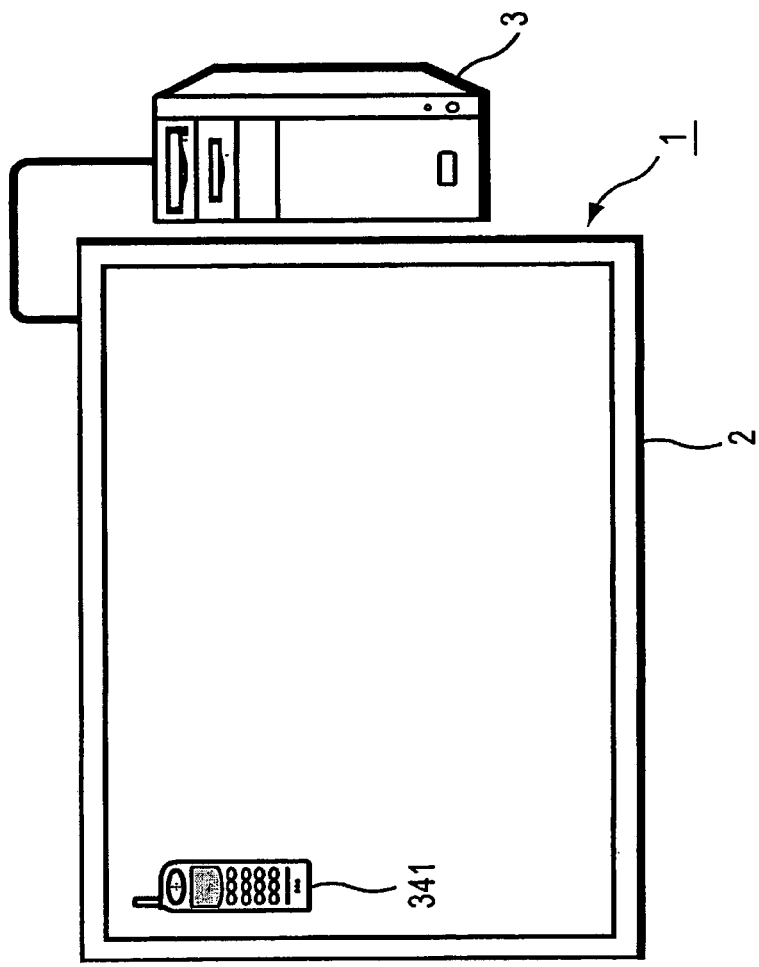
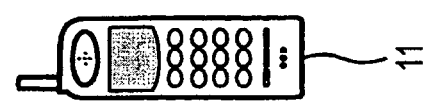

METHOD AND APPARATUS FOR DISPLAYING AN IMAGE OF A DEVICE BASED ON RADIO WAVES

This is a continuation of application Ser. No. 13/331,685, filed Dec. 20, 2011, which is a continuation of application Ser. No. 10/488,212, filed Feb. 26, 2004 (now U.S. Pat. No. 8,108,005), which claims the benefit of priority to Japanese Patent Application No. 2001-257308, filed Aug. 28, 2001 and PCT Application PCT/JP02/08643 filed Aug. 28, 2002, the entire contents of four of which are incorporated herein by reference.

TECHNICAL FIELD

The present invention relates to information processing apparatuses and methods, and recording media, and more particularly, to an information processing apparatus and method, and a recording medium in which communication can be performed via radio waves.

BACKGROUND ART

Cellular telephones and PDAs (Personal Digital Assistants) are coming into widespread use. As a result of this, users exchange information between a plurality of such devices more frequently.

Hitherto, when exchanging information as described above, information is sent and received by connecting devices with each other via a cradle or a cable or by allowing infrared transmitters/receivers to face each other.

However, wired connection makes the operation troublesome and complicated, and also, a connector compatible with each device type must be prepared.

In infrared communication, if the user inadvertently passes through the infrared transmission channel, communication is interrupted.

It has been suggested that wireless communication is performed between a plurality of devices by using a wireless LAN (Local Area Network) or a short-distance wireless LAN, for example, Bluetooth®.

However, when exchanging information, for example, between a PDA owned by the user and a device installed in front of the user, the user is unable to know whether communication can be made between the devices unless he/she actually perform communication. In this manner, when performing wireless communication, the user is unable to know a communication distance at which information can be exchanged by connecting devices.

DISCLOSURE OF INVENTION

Accordingly, in view of this background, it is an object of the present invention to reliably exchange information when performing wireless communication by allowing a user to know a communication distance at which devices can be connected.

An information processing apparatus of the present invention includes: communication means for communicating with an electronic device via radio waves; and display control means for controlling an image corresponding to the electronic device to be displayed based on the input level of the radio waves transmitted from the electronic device.

The information processing apparatus may further include: detection means for detecting that the electronic device is disposed in proximity with the information processing apparatus; and obtaining means for obtaining identification information concerning the electronic device when the detection means detects that the electronic device is disposed in proximity with the information processing apparatus. The communication means may communicate with the electronic device based on the identification information.

The display control means may control the image to be displayed with a level of transparency corresponding to the input level of the radio waves.

The display control means may control the image to be displayed at a position corresponding to the input level of the radio waves.

The display control means may control the image to be displayed with a size corresponding to the input level of the radio waves.

The display control means may control the image to be displayed with a level of resolution corresponding to the input level of the radio waves.

The display control means may control the image to be displayed with a level of saturation corresponding to the input level of the radio waves.

The display control means may control the image to be displayed by performing mosaic processing on the image in accordance with the input level of the radio waves.

An information processing method of the present invention includes: a communication processing step of communicating with an electronic device via radio waves; and a display control processing step of controlling an image corresponding to the electronic device to be displayed based on the input level of the radio waves transmitted from the electronic device.

A program recorded on a recording medium of the present invention allows a computer to execute: a communication processing step of communicating with an electronic device via radio waves; and a display control processing step of controlling an image corresponding to the electronic device to be displayed based on the input level of the radio waves transmitted from the electronic device.

According to the information processing apparatus and method, the program recorded on the recording medium of the present invention, communication is performed with an electronic device via radio waves, and the display of an image corresponding to the electronic device is controlled based on the input level of the radio waves transmitted from the electronic device.

BRIEF DESCRIPTION OF THE DRAWINGS

FIG. 17 illustrates an example of the display indicating the communication status.

FIG. 18 illustrates an example of the display indicating the communication status.

FIG. 21 illustrates an example of the display indicating the communication status.

FIG. 22 illustrates an example of the display indicating the communication status.

BEST MODE FOR CARRYING OUT THE INVENTION

Figure 1:
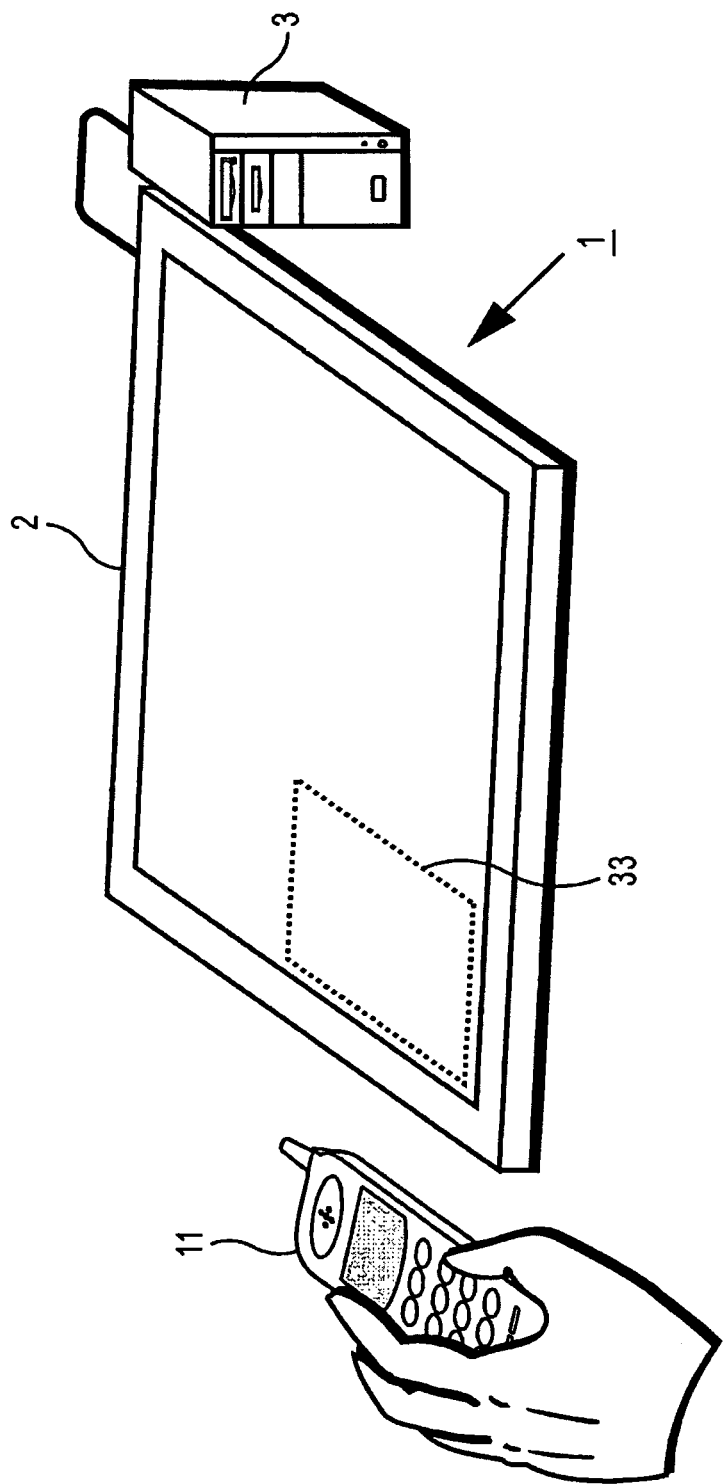
FIG. 1 illustrates an example of the configuration of an information processing system to which the present invention is applied.

FIG. 1 illustrates an example of the configuration of an information processing system to which the present invention is applied. In this example, a personal computer 1 is provided with an input display unit 2 and a main unit 3 connected to the input display unit 2. The input display unit 2 displays predetermined information, and also, predetermined information can be input by operating, for example, a pen (not shown) on the input display unit 2.

If necessary, the user can place, for example, a cellular telephone 11, on the input display unit 2 so as to send and receive data between the cellular telephone 11 and the personal computer 1.

Figure 2:
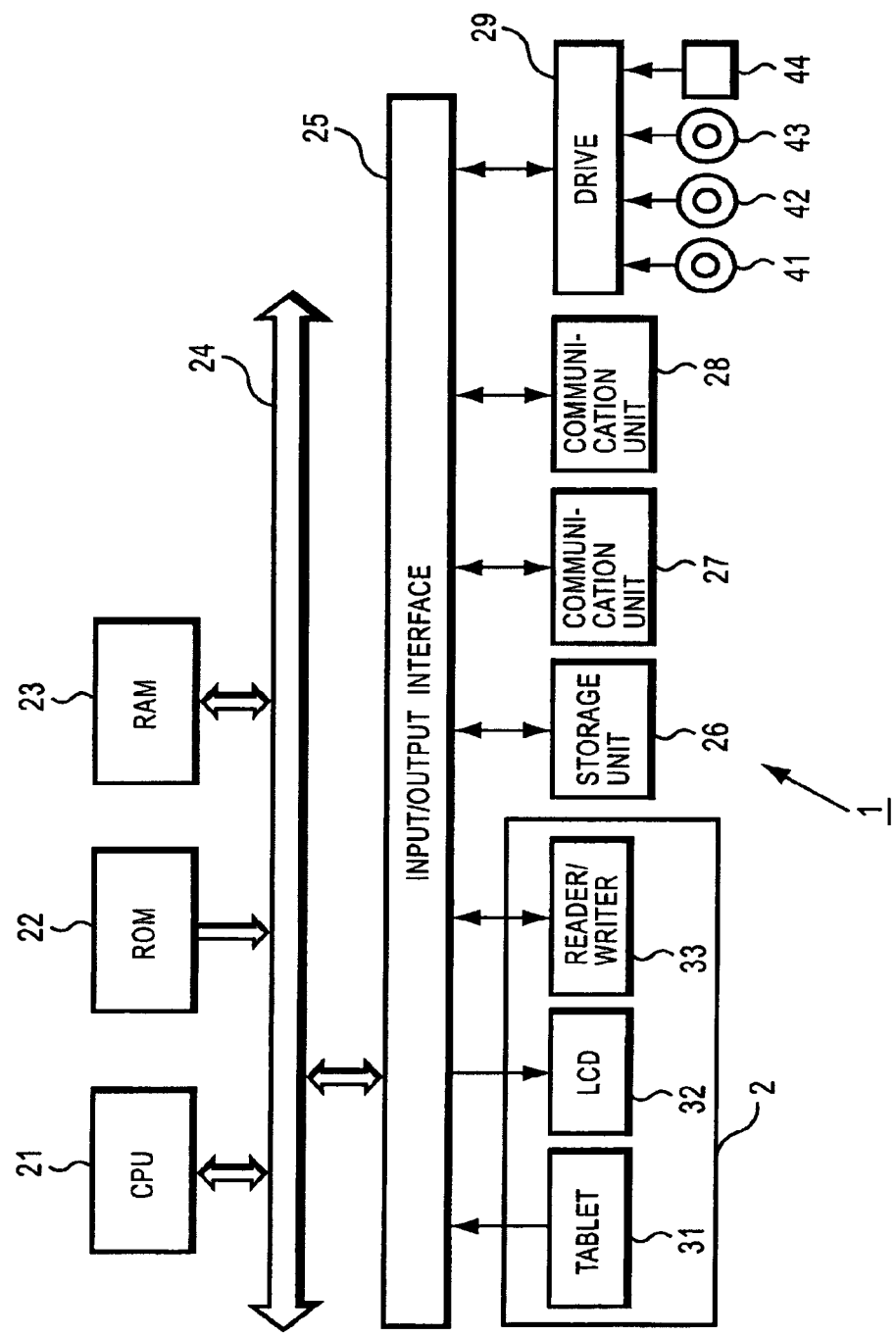
FIG. 2 is a block diagram illustrating an example of the configuration of a personal computer shown in FIG. 1.

FIG. 2 illustrates an example of the configuration of the personal computer 1. A CPU (Central Processing Unit) 21 executes various types of processing according to programs stored in a ROM (Read Only Memory) 22 or a storage unit 26. A RAM (Random Access Memory) 23 suitably stores programs, data, etc. executed by the CPU 21. The CPU 21, the ROM 22, and the RAM 23 are connected to each other via a bus 24. An input/output interface 25 is also connected to the bus 24. The input/output interface 25 is connected, not only to the input display unit 2, but also to the storage unit 26 formed of, for example, a hard disk, and to a communication unit 27 that communicates with other devices via, for example, a telephone line.

A communication unit 28 is a so-called "Bluetooth module". The communication unit 28 performs Bluetooth communication with, for example, a communication unit 213 (see FIG. 6), which is a Bluetooth module, provided for the cellular telephone 11.

Bluetooth is a wireless communication standard standardized by the Bluetooth SIG (Special Interest Group), and a device communicates with other devices provided with Bluetooth modules (hereinafter sometimes referred to as "Bluetooth devices") by using the 2.4 GHz band (ISM (Industrial Science Medical) band).

A network formed by Bluetooth is referred to as "piconet" or "scatternet" formed of a plurality of piconets connected with each other depending on the network type, and in such a network, Bluetooth devices, which serve as a master and slaves, are provided. A Bluetooth device, which serves as a master, is simply referred to as a "master", and Bluetooth devices, which serve as slaves, are simply referred to as "slaves".

After forming a piconet, in order to send and receive various items of information, it is necessary for all the Bluetooth devices in the piconet to establish synchronization in the frequency domain and in the time domain.

Establishing synchronization in the frequency domain and in the time domain is briefly described.

In Bluetooth, for example, a master sends a signal to a slave by using a frequency range of 79 MHz. In this case, instead of sending information by using all the frequency range, the master sends the information by randomly changing (hopping) this frequency range in units of 1 MHz.

The slave, which is the receiving device, receives the information sent from the master by suitably changing the reception frequency in synchronization with the randomly changing transmission frequency of the master.

The frequency pattern changed by the master and the slave is referred to as the "frequency hopping pattern". When the frequency hopping pattern is shared between the master and the slave, it means that the synchronization in the frequency domain is established.

In Bluetooth, since a master and a plurality of slaves perform communication, the communication channel between the master and the slaves is divided in a time-division multiplexing manner in units of 625 μs. The time intervals of the time units of 625 μs are referred to as "time slots", and when the time slot is shared, it means that the synchronization in the time domain is established.

All the slaves each calculate the frequency hopping pattern for establishing synchronization in the frequency domain based on the Bluetooth address of the master, and also adds an offset to the Bluetooth clock managed by the slave based on the Bluetooth clock of the master so as to provide timing for the time slot for establishing synchronization in the time domain.

The Bluetooth address is represented by 48 bits unique to each Bluetooth device, and based on this address, the frequency hopping pattern is uniquely calculated. The Bluetooth clock is managed by each Bluetooth device.

Accordingly, before forming a piconet, various items of information including the Bluetooth addresses and the Bluetooth clocks for establishing synchronization in the frequency domain and in the time domain, respectively, are sent and received between the master and the slaves.

Referring back to FIG. 2, the input display unit 2 is provided with a transparent tablet 31 for detecting the operation of a pen performed by the user, and an LCD (Liquid Crystal Display) 32 disposed under the tablet 31 for displaying images of, for example, characters and graphics. The input display unit 2 is also provided with a reader/writer 33 that communicates with an RF tag 212 (FIG. 6) provided for the cellular telephone 11.

A drive 29 is connected to the input/output interface 25, and a magnetic disk 41, an optical disc 42, a magneto-optical disk 43, or a semiconductor memory 44 is attached to this drive 29 when necessary. A program read from the magnetic disk 41, the optical disc 42, the magneto-optical disk 43, or the semiconductor memory 44 is supplied from the drive 29 to the storage unit 26 via the input/output interface 25.

Figure 3:
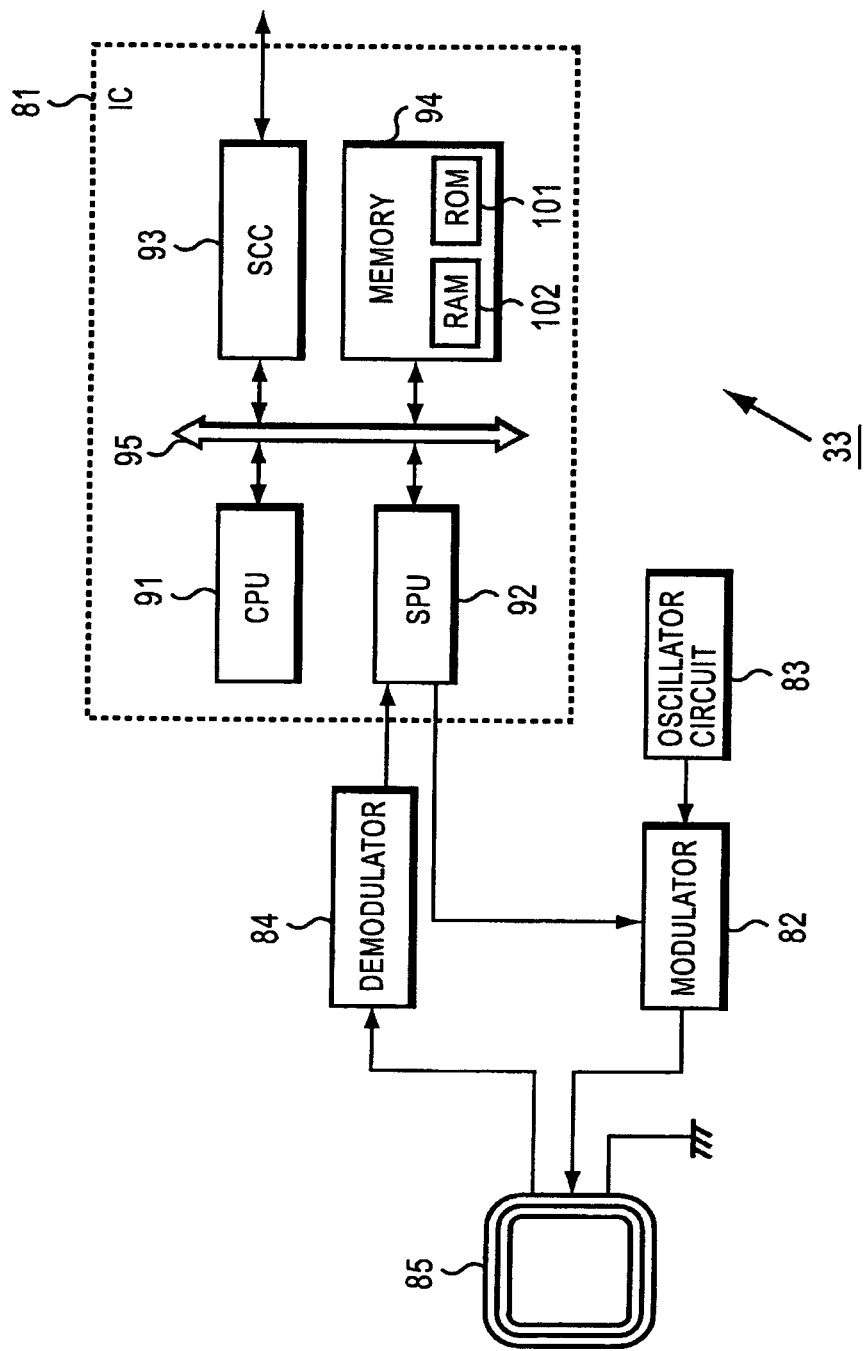
FIG. 3 is a block diagram illustrating the configuration of a reader/writer 33.

FIG. 3 is a block diagram illustrating an example of a detailed configuration of the reader/writer 33.

An IC 81 is formed of a CPU 91, an SPU (Signal Processing Unit) 92, an SCC (Serial Communication Controller) 93, and a memory 94. The memory 94 includes a ROM 101 and a RAM 102. The CPU 91, the SPU 92, the SCC 93, and the memory 94 are connected to each other via a bus 95.

The CPU 91 expands a control program stored in the ROM 101 to the RAM 102, and performs various types of processing based on response data sent from the RF tag 212 of the cellular telephone 11, which is described below, or a control signal supplied from the CPU 21 shown in FIG. 2. For example, the CPU 91 generates a command to be sent to the RF tag 212 and outputs it to the SPU 92 via the bus 95, or authenticates data sent from the RF tag 212.

When the cellular telephone 11 is placed in proximity with the personal computer 1, and then, when the name of the Bluetooth device is reported according to the processing of the various elements, which is described below, the CPU 91 informs the communication unit 28 that the cellular telephone 11 is placed close to the personal computer 1 based on an instruction of the CPU 21.

When response data from the RF tag 212 is supplied from a demodulator 84, the SPU 92 performs, for example, BPSK (Binary Phase Shift Keying) demodulation, on that data, and supplies the resulting data to the CPU 91. When a command to be sent to the RF tag 212 is supplied via the bus 95, the SPU 92 performs modulation (primary modulation) on that command, and outputs the resulting data to a modulator 82.

The SCC 93 outputs data supplied from the CPU 21 to the CPU 91 via the bus 95, and outputs data supplied from the CPU 91 via the bus 95 to the CPU 21.

The modulator 82 performs ASK (Amplitude Shift Keying) modulation on the carrier wave of a predetermined frequency supplied from an oscillator circuit (OSC) 83 as the secondary modulation based on data supplied from the SPU 92, and outputs the generated modulation wave from an antenna 85 as electromagnetic waves. Meanwhile, the demodulator 84 demodulates a modulated wave (ASK-modulated wave) obtained via the antenna 85 and outputs the demodulated data to the SPU 92.

The antenna 85 radiates a predetermined electromagnetic wave, and then, based on a change of the load with respect to the electromagnetic wave, the antenna 85 detects whether the RF tag 212 (cellular telephone 11) has been placed in proximity with the personal computer 1. When the RF tag 212 is placed in proximity with the personal computer 1, the antenna 85 sends and receives various items of data to and from the RF tag 212.

Figure 4:
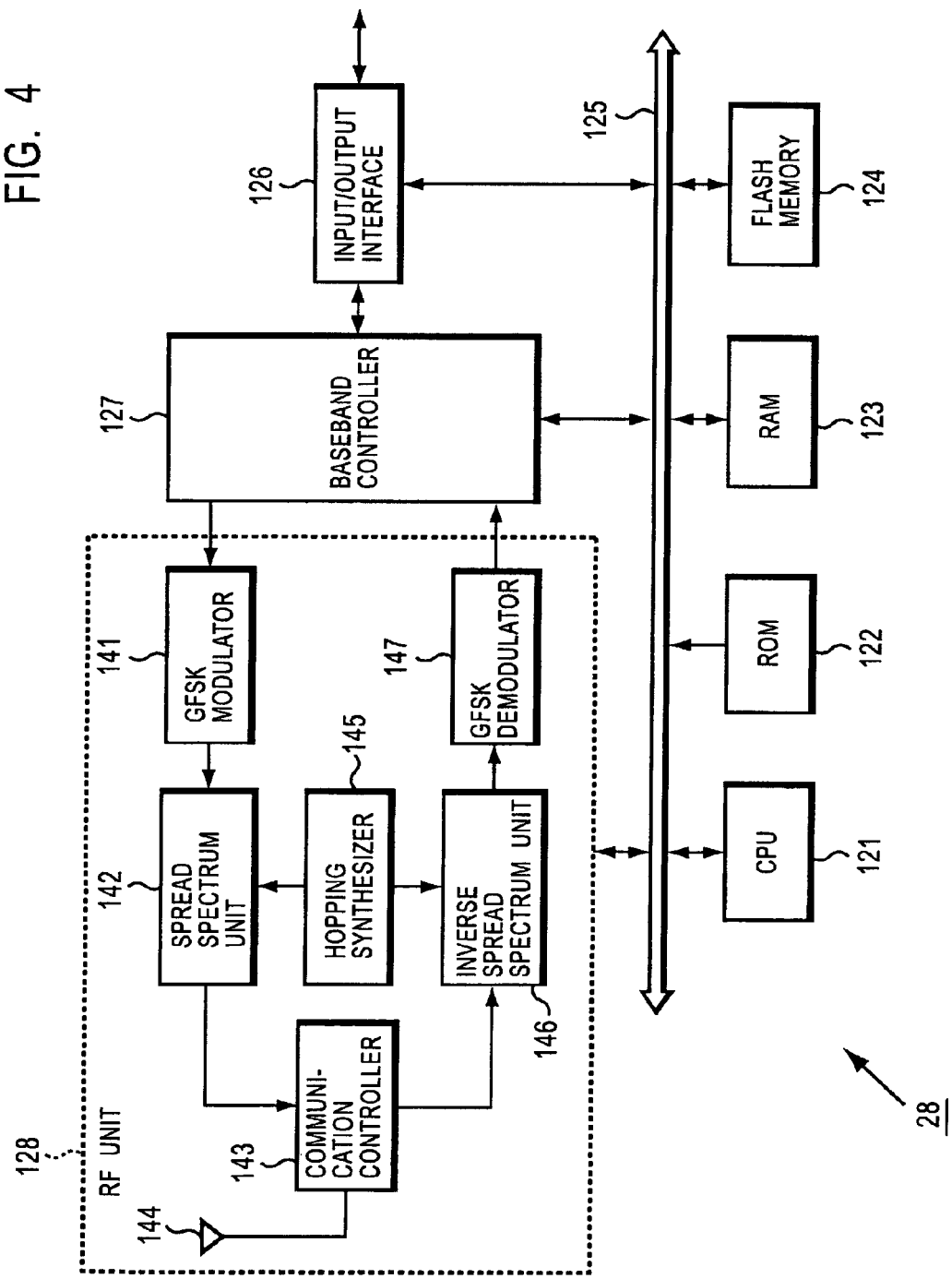
FIG. 4 is a block diagram illustrating the configuration of a communication unit 28.

FIG. 4 is a block diagram illustrating an example of a detailed configuration of the communication unit 28, which serves as a Bluetooth module.

A CPU 121 expands a control program stored in a ROM 122 into a RAM 123, and controls the overall operation of the communication unit 28. The CPU 121, the ROM 122, and the RAM 123 are connected to each other via a bus 125, and a flash memory 124 is connected to the bus 125.

The flash memory 124 stores therein the name of a Bluetooth device that is set for each Bluetooth device and can be changed according to the user's favorite, and also stores the Bluetooth address unique to each Bluetooth device.

The Bluetooth address is a 48-bit identifier, which is used for various types of processing for managing Bluetooth devices since it is inherent in (unique to) each Bluetooth device.

For example, as discussed above, for establishing synchronization in a piconet, it is necessary for all the slaves to obtain information concerning the frequency hopping pattern of the master. This frequency hopping pattern can be calculated by the slaves based on the Bluetooth address of the master.

More specifically, the Bluetooth address is formed of the lower 24-bit LAP (Low Address Part), the next 8-bit UAP (Upper Address Part), and the remaining 16-bit NAP (Non-significant Address Part). For calculating the frequency hopping pattern, a total of 28 bits consisting of the whole 24 bits of LAP and the lower 4 bits of UAP are used.

Each slave is able to calculate the frequency hopping pattern based on the above-described 28 bits of the Bluetooth address of the master, which is obtained when paging the master to establish synchronization in the piconet, and based on the Bluetooth clock reported from the master.

In this frequency hopping pattern, the inquiry frequency hopping pattern used when making an inquiry, the paging frequency hopping pattern used when paging, and the channel frequency hopping pattern used when performing communication between the master and a slave after establishing synchronization in the piconet are defined. The three frequency hopping patterns are hereinafter simply referred to as the "frequency hopping pattern" unless they should be distinguished from each other.

The flash memory 124 stores link keys for authenticating a Bluetooth device, which is a communicating party, or for encrypting data to be sent after establishing synchronization in a piconet, and provides the stored link keys to the CPU 121 if necessary.

An input/output interface 126 manages input/output of data supplied from the CPU 21 shown in FIG. 2 or data supplied from a baseband controller 127 based on an instruction from the CPU 121.

The baseband controller 127 outputs data supplied from the input/output interface 126 to a GFSK (Gaussian Frequency Shift Keying) modulator 141 so as to send the data to the cellular telephone 11, and outputs data supplied from a GFSK demodulator 147 to the bus 125 or the input/output interface 126.

The GFSK modulator 141 restricts high frequency components of data supplied from the baseband controller 127 by using a filter so as to perform frequency modulation on the data as the primary modulation, and outputs the resulting data to a spread spectrum unit 142.

The spread spectrum unit 142 switches between the frequency carriers based on the frequency hopping pattern calculated as described above and reported from a hopping synthesizer 145, performs spread spectrum on the supplied data, and then outputs the resulting signal to a communication controller 143. In Bluetooth, the spread spectrum unit 142 sends data by performing frequency hopping in every 625 μs.

The communication controller 143 sends the spread-spectrum signal from an antenna 144 by using the 2.4 GHz band.

The communication controller 143 also outputs a received signal from the antenna 144 to an inverse spread spectrum unit 146.

The inverse spread spectrum unit 146 hops the reception frequency based on the frequency hopping pattern reported from the hopping synthesizer 145 so as to obtain, for example, a signal from the cellular telephone 11. The inverse spread spectrum unit 146 also performs inverse spread spectrum on a signal from the cellular telephone 11, and outputs the reproduced signal to the GFSK demodulator 147. The GFSK demodulator 147 performs GFSK demodulation on the signal supplied from the inverse spread spectrum unit 146, and outputs the resulting data to the baseband controller 127.

Figure 5:
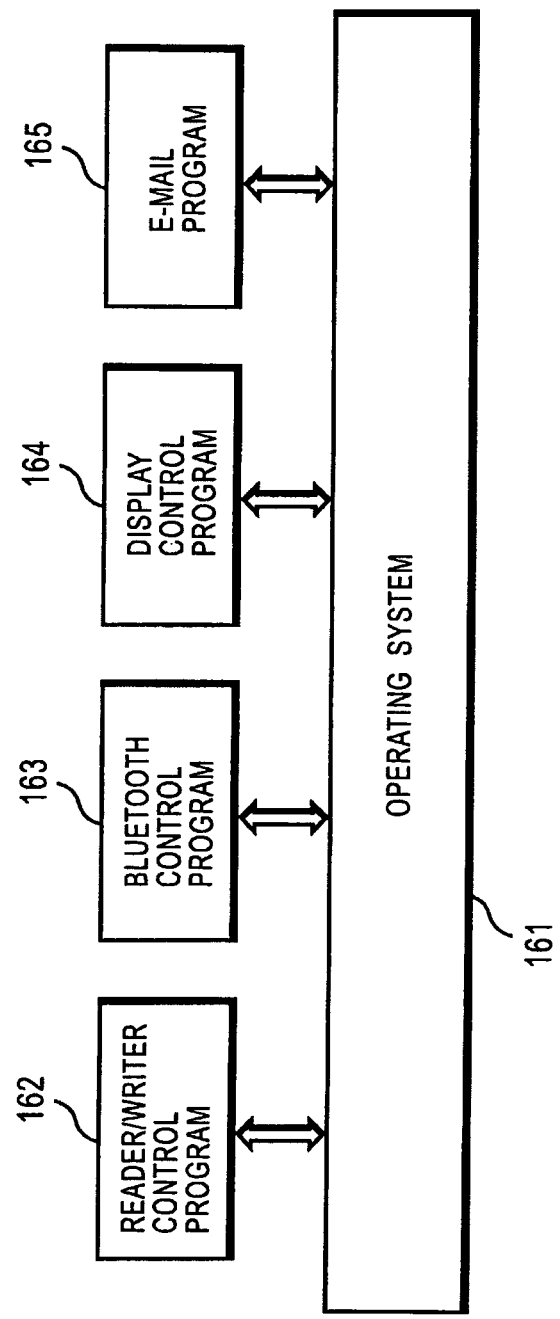
FIG. 5 is a block diagram illustrating the configuration of programs executed by the personal computer 1.

FIG. 5 is a block diagram illustrating the configuration of programs executed by the personal computer 1. An operating system (basic program software) 161 is, for example, Windows® Me, Windows® 2000 by Microsoft Corporation, or Mac OS® by Apple Computer Inc., and controls the basic operation of the computer.

A reader/writer control program 162 controls the reader/writer 33 so as to detect the presence of a terminal integrating the RF tag 212 therein which is placed in proximity with the personal computer 1 or to send and receive various items of information to and from that terminal via electromagnetic waves.

A Bluetooth control program 163 controls the communication unit 28 so as to, for example, detect the presence of a Bluetooth device placed in proximity with the personal computer 1 or to establish synchronization for communicating with that Bluetooth device.

A display control program 164 controls the display of images of, for example, characters and graphics, on the LCD 32 of the input display unit 2.

An e-mail program 165 sends e-mail to other devices, for example, a server, or receives e-mail from the other devices via the communication unit 27.

Figure 6:
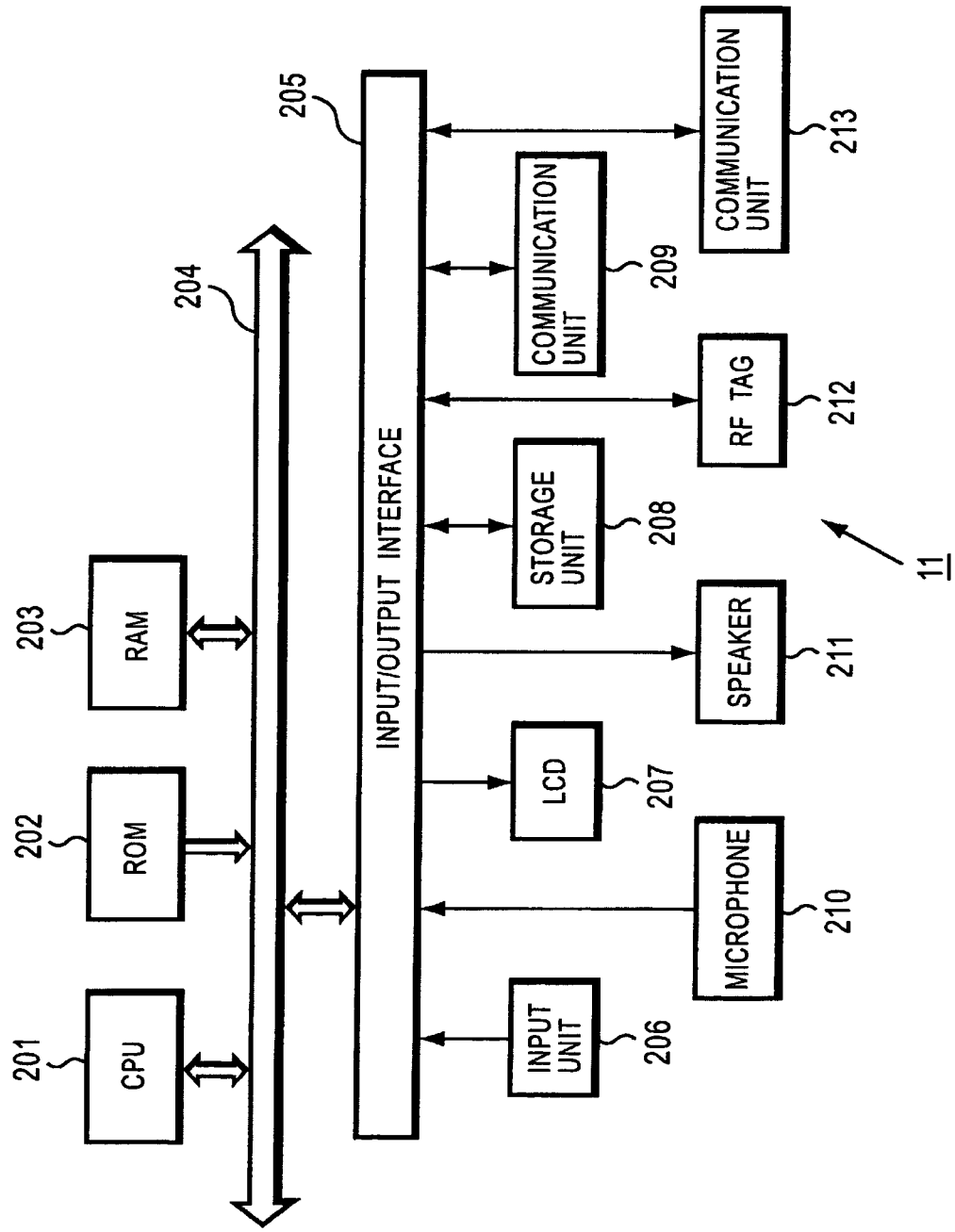
FIG. 6 is a block diagram illustrating the configuration of a cellular telephone 11.

FIG. 6 illustrates an example of the configuration of the cellular telephone 11. A CPU 201, a ROM 202, a RAM 203, a bus 204, and an input/output interface 205 have functions basically similar to those of the CPU 21, the ROM 22, the RAM 23, the bus 24, and the input/output interface 25, respectively; of the personal computer 1 shown in FIG. 2, and an explanation thereof is thus omitted.

In the cellular telephone 11, the input/output interface 205 is connected to an input unit 206 formed of, for example, various buttons and switches, and is also connected to an LCD 207 for displaying predetermined information. A storage unit 208 formed of, for example, a semiconductor memory, and a communication unit 209 for performing communication via a telephone line are also connected to the input/output interface 205.

A microphone 210 records user voice therein, and a speaker 211 outputs sound to the user. The RF tag 212 has a built-in IC, and communicates with the reader/writer 33 of the personal computer 1 so as to send the name of the Bluetooth device integrated in the cellular telephone 11 to the reader/writer 33. The RF tag 212 has the function of storing data supplied from the reader/writer 33 in a built-in memory.

A communication unit 213 is a Bluetooth module. The communication unit 213 forms, for example, a piconet with the communication unit 28 of the personal computer 1, and sends and receives various items of data based on an instruction from the CPU 201.

The configuration of the communication unit 213 is similar to that of the communication unit 28 shown in FIG. 4, and a detailed explanation thereof is thus omitted.

Figure 7:
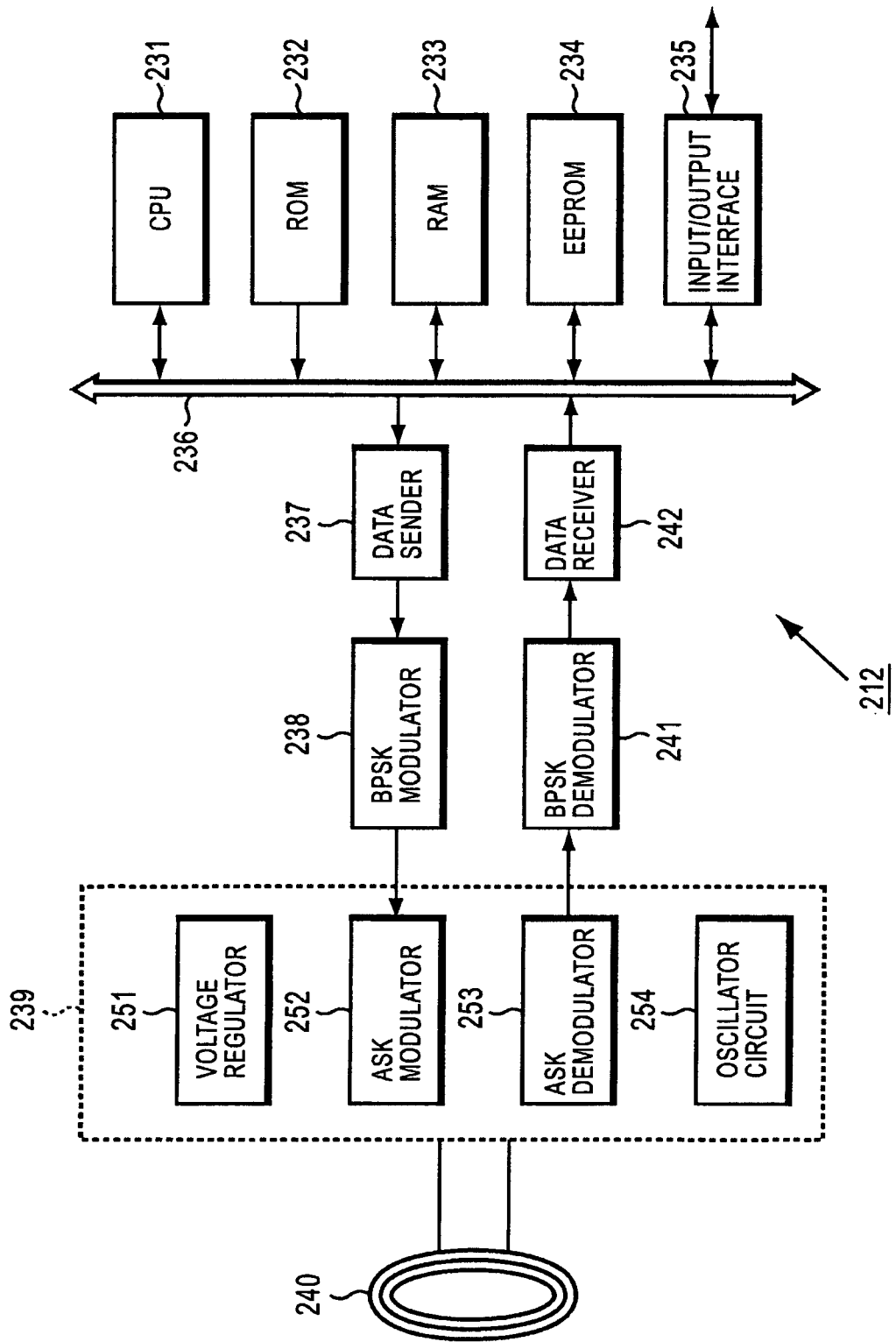
FIG. 7 is a block diagram illustrating the configuration of an RF tag 212.

FIG. 7 is a block diagram illustrating an example of a detailed configuration of the RF tag 212.

The RF tag 212 is formed of, for example, a one-chip IC in which an antenna 240 shown in FIG. 7 and the elements other than the antenna 240 are stored. An example of the devices having a function basically similar to that of the RF tag 212 is Felica®.

A CPU 231 expands a control program stored in a ROM 232 into a RAM 233 so as to control the overall operation of the RF tag 212. When electromagnetic waves radiating from the reader/writer 33 are received by the antenna 240, the CPU 231 reports ID information set in the RF tag 212 to the reader/writer 33 accordingly.

The setting of the ID information can be changed as desired, and the ID information contains, for example, the same name as the name of the Bluetooth device set in the communication unit 213 (cellular telephone 11), which serves as a Bluetooth module, or a name containing that Bluetooth device name.

In FIG. 7, a data sender 237, a BPSK modulator 238, a BPSK demodulator 241, and a data receiver 242 correspond to the SPU 92 of the reader/writer 33 shown in FIG. 3, and an ASK modulator 252 and an ASK demodulator 253 correspond to the modulator 82 and the demodulator 84, respectively. The basic processing is similar to that described above, and a detailed explanation is thus omitted.

For example, when the cellular telephone 11 is placed in proximity with the personal computer 1, ID information is read from an EEPROM 234 and is output to the data sender 237. The ID information supplied to the data sender 237 is subjected to BPSK modulation in the BPSK modulator 238 as the primary modulation, and is then output to the ASK modulator 252.

The ASK modulator 252, for example, turns ON/OFF a predetermined switching device in accordance with the data supplied from the BPSK modulator 238 so as to change the load of the antenna 240. The ASK modulator 252 then performs ASK modulation on a modulation wave from the reader/writer 33 received by the antenna 240 so as to send the modulated components to the reader/writer 33 (changes the terminal voltage of the antenna 85 of the reader/writer 33).

In addition to the reporting of the ID information to the personal computer 1, the RF tag 212 performs various types of processing, for example, authentication processing with the reader/writer 33 and encryption processing of data to be sent.

Figure 8:
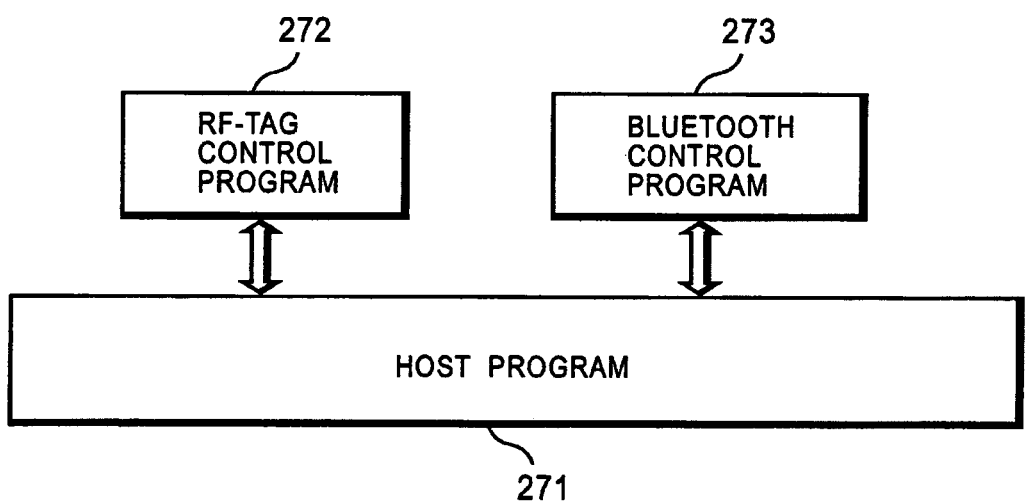
FIG. 8 illustrates an example of the functional blocks of the cellular telephone 11.

FIG. 8 illustrates an example of functional blocks of the cellular telephone 11.

A host program 271 provides basic functions of the cellular telephone 11, for example, a calling function and an e-mail sending/receiving function. An RF-tag control program 272 controls the operation of the RF tag 212, and also performs various types of processing based on an instruction from the host program 271.

For example, when the cellular telephone 11 is placed in proximity with the personal computer 1, the RF-tag control program 272 provides set ID information to the reader/writer 33, and starts the communication unit 213 (Bluetooth control program 273), which serves as a Bluetooth module, upon receiving electromagnetic waves from the reader/writer 33.

The Bluetooth control program 273 controls the operation of the communication unit 213 so as to implement communication with other Bluetooth devices.

The operations performed by the personal computer 1 and the cellular telephone 11 are described below with reference to the flowcharts of FIGS. 9 and 10. When the user wishes to send and receive data between the cellular telephone 11 and the personal computer 1, he/she places the cellular telephone 11 at a predetermined position (at a position, indicated by the broken lines in FIG. 1, in which the reader/writer 33 is disposed) of the input display unit 2.

The reader/writer 33 regularly sends electromagnetic waves at sufficiently short intervals, and when the cellular telephone 11 is placed on the input display unit 2 (on the reader/writer 33), the equivalent impedance of the antenna integrated in the reader/writer 33 changes due to the electromagnetic coupling between the reader/writer 33 and the RF tag 212 of the cellular telephone 11. In step S1 of FIG. 9, under the control of the reader/writer control program 162, the reader/writer 33 monitors this impedance change so as to determine whether the cellular telephone 11 is placed on the reader/writer 33, and waits until the cellular telephone 11 is placed.

When the cellular telephone 11 is placed on the reader/writer 33, in step S2, the reader/writer 33 requests the cellular telephone 11 to send the name of the Bluetooth device corresponding to the communication unit 213 under the control of the reader/writer control program 162.

In response to this request, the name of the Bluetooth device is sent from the cellular telephone 11, as described below. Then, in step S3, the reader/writer 33 waits until it receives the name of the Bluetooth device from the cellular telephone 11 under the control of the reader/writer control program 162, and upon receiving this, the process proceeds to step S4. In step S4, the reader/writer 33 supplies the received name of the Bluetooth device of the cellular telephone 11 to the CPU 21. The CPU 21 then supplies the name of the Bluetooth device to the RAM 23 and stores it therein under the control of the reader/writer control program 162.

Then, in step S5, the CPU 21, which executes the Bluetooth control program 163, controls the communication unit 28 to connect to the Bluetooth device corresponding to the device name of the cellular telephone 11 stored in step S4, thereby setting a link required for transferring data.

More specifically, when the communication unit 213 of the cellular telephone 11 is in the waiting phase, the CPU 21 controls the communication unit 28 to inquire and page a synchronization establishing phase so as to establish synchronization with the communication unit 213.

Upon establishing synchronization between the communication unit 28 and the communication unit 213, the communication unit 28 of the personal computer 1 and the communication unit 213 of the cellular telephone 11 shift to the communication connection phase.

The CPU 21 controls the communication unit 28 to send a control packet for setting a communication link to the Bluetooth device corresponding to the device name of the cellular telephone 11, i.e., the communication unit 213, among the Bluetooth devices in the piconet in which the synchronization in the frequency domain and in the time domain is established, thereby establishing an ACL (Asynchronous Connection-Less) link required for the processing of the subsequent step.

Thereafter, in step S6, the personal computer 1 performs predetermined processing with the cellular telephone 11 via a network. Specific examples of the processing are described below.

Figure 10:
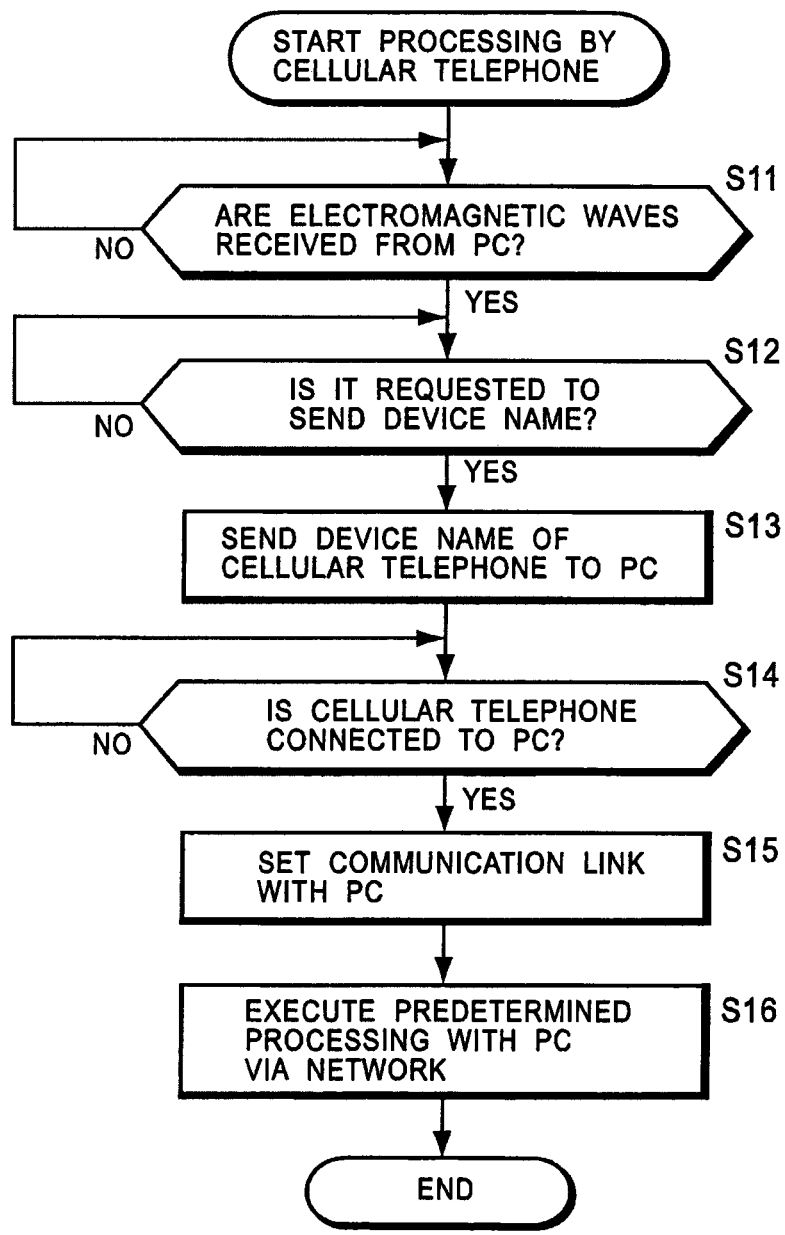
FIG. 10 is a flowchart illustrating the processing performed by the cellular telephone in the information processing system shown in FIG. 1.

Meanwhile, in step S11 of FIG. 10, the RF tag 212 of the cellular telephone 11 determines whether electromagnetic waves from the reader/writer 33 of the personal computer 1 have been received (whether the cellular telephone 11 is placed on the input display unit 2 of the personal computer 1). If it is determined that the cellular telephone 11 is placed on the input display unit 2, the process proceeds to step S12. In step S12, the RF tag 212 waits for a request to send the name of the Bluetooth device under the control of the RF-tag control program 272. As discussed above, the reader/writer 33 of the personal computer 1 requests the cellular telephone 11 to send the name of the Bluetooth device in step S2. If it is determined that this request has been received, the process proceeds to step S13 in which the RF tag 212 reads the name of the Bluetooth device stored in the built-in memory and sends it to the reader/writer 33 under the control of the RF-tag control program 272.

The name of the Bluetooth device may be stored in the ROM 202 or the storage unit 208, in which case, the name read from the ROM 202 or the storage unit 208 by the CPU 201 is sent from the RF tag 212.

In step S14, the CPU 201 of the cellular telephone 11, which executes the Bluetooth control program 273, waits until the communication unit 28 of the personal computer 1 and the communication unit 213 are connected to each other via Bluetooth communication (in this case, until the communication units 28 and 213 shift to the communication connection phase).

If the communication unit 213 determines in step S14 that it is connected to the communication unit 28 of the personal computer 1 via Bluetooth communication under the control of the Bluetooth control program 273, the process proceeds to step S15. Since the communication unit 28 of the personal computer 1 sends a control packet for setting the communication link in step S5, the communication unit 213 receives this control packet so as to set the communication link with the personal computer 1.

Thereafter, the process proceeds to step S16 in which the cellular telephone 11 performs predetermined processing with the personal computer 1 via a network. This processing corresponds to the processing of step S6 of FIG. 9.

In the above-described example, the name of the Bluetooth device of the cellular telephone 11 is sent and received as the ID information. An ID number other than the name of the Bluetooth device of the cellular telephone 11 may be sent from the cellular telephone 11 to the personal computer 1, and the personal computer 1 may search for the name of the Bluetooth device of the cellular telephone 11 as the network address based on the ID number.

Figure 11:
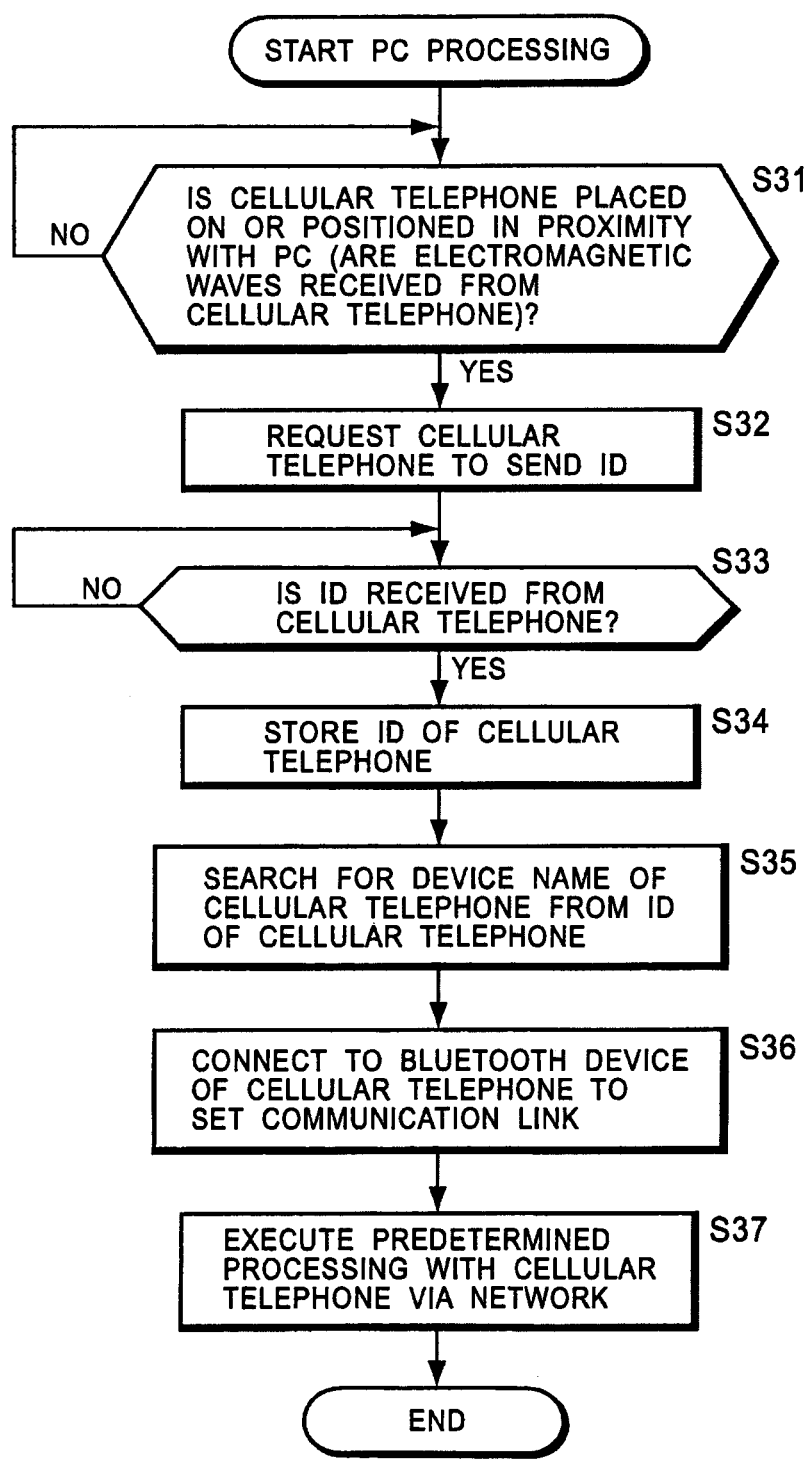
FIG. 11 is a flowchart illustrating the processing performed by the personal computer in the information processing system shown in FIG. 1.
Figure 12:
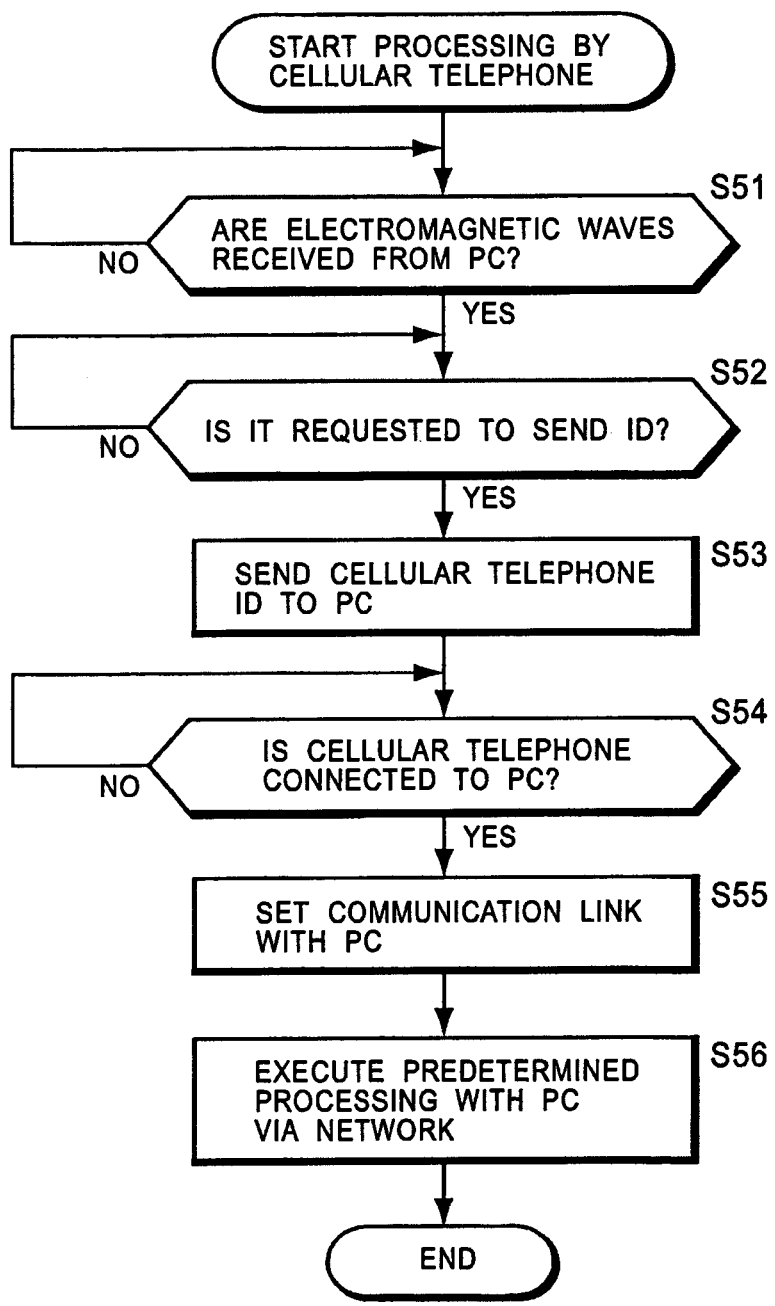
FIG. 12 is a flowchart illustrating the processing performed by the cellular telephone in the information processing system shown in FIG. 1.

FIGS. 11 and 12 illustrate the operations of the personal computer 1 and the cellular telephone 11, respectively, in this modification.

Operations of steps S51 through S56 of the cellular telephone 11 shown in FIG. 12 are basically similar to those of steps S11 through S16 of FIG. 10. The process shown in FIG. 12 is different from that of FIG. 10 in that, in step S52, instead of the device name, the ID number is requested from the personal computer 1, and the data sent in step S53 is not the device name, but the ID number. Operations other than steps S52 and S53 are similar to those of FIG. 10.

Figure 9:
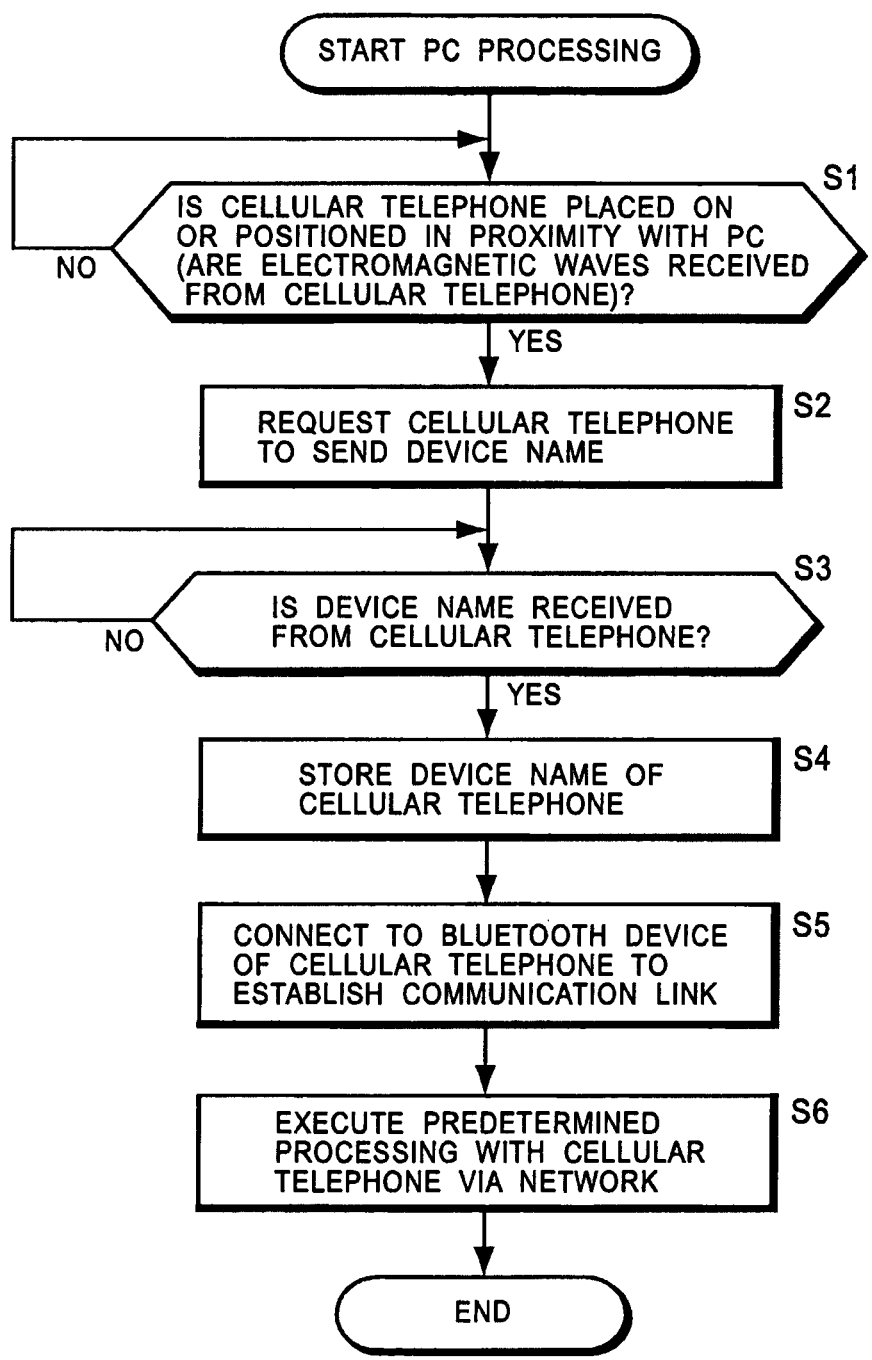
FIG. 9 is a flowchart illustrating the processing performed by the personal computer in the information processing system shown in FIG. 1.

Similarly, operations in steps S31 through S37 of the personal computer 1 shown in FIG. 11 are basically similar to those in steps S1 through S6 of FIG. 9. In the process of FIG. 11, however, instead of the name of the Bluetooth device being directly sent from the cellular telephone 11, the ID number is sent. Accordingly, in step S34, the CPU 21 of the personal computer 1 stores the ID number of the cellular telephone 11 in the RAM 23, and then, in step S35, the CPU 21 searches for the name of the Bluetooth device from the ID number of the cellular telephone 11. For searching for the device name, a table in which the ID number of the cellular telephone 11 is associated with the name of the Bluetooth device may be prestored in the storage unit 26. Alternatively, the communication unit 27 may access a predetermined server via, for example, the Internet, so as to search for the name of the Bluetooth device corresponding to the ID number of the cellular telephone 11 via this server.

The process after searching for the name of the Bluetooth device of the cellular telephone 11 is similar to that of FIG. 9.

A further explanation of examples of the operation executed in step S6 of FIG. 9 (step S37 of FIG. 11) and the operation executed in step S16 of FIG. 10 (step S56 of FIG. 12) is given below.

Figure 13:
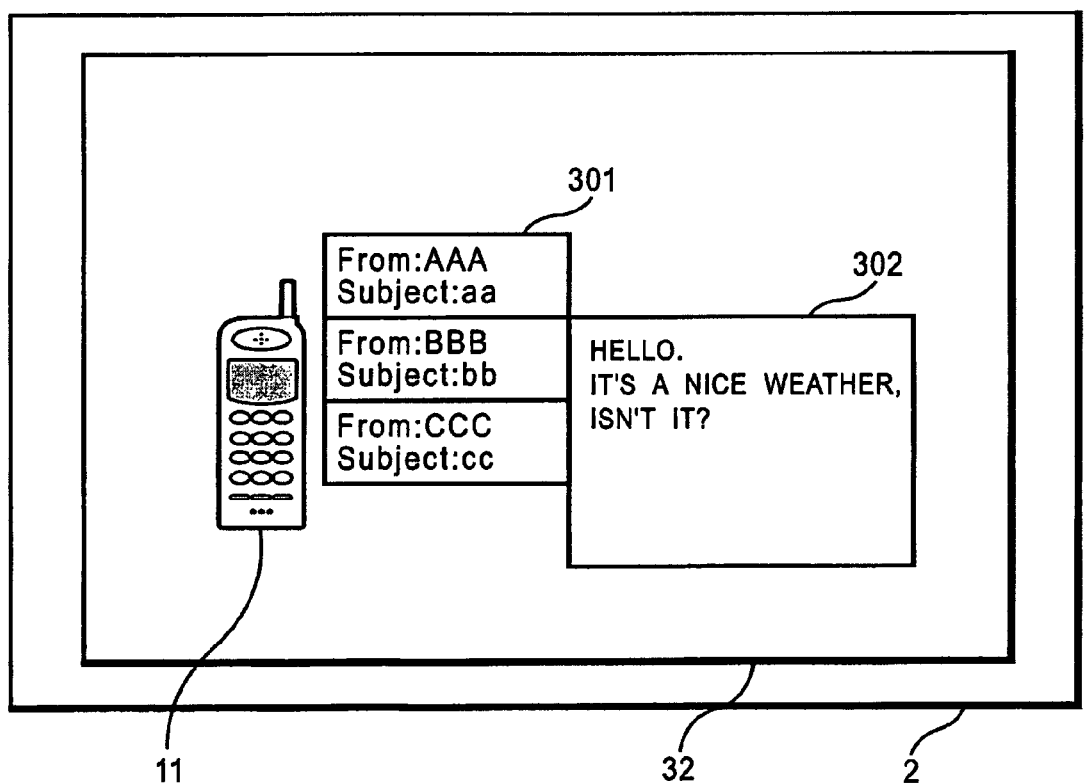
FIG. 13 illustrates the sending and receiving of data between the cellular telephone and the personal computer.

FIG. 13 illustrates an example in which a mail message registered in the cellular telephone 11 is enlarged and displayed on the LCD 32 of the input display unit 2 by placing the cellular telephone 11 on the input display unit 2.

The processing performed by the cellular telephone 11 and the processing performed by the personal computer 1 in this case are described below with reference to the flowcharts of FIGS. 14 and 15.

Figure 14:
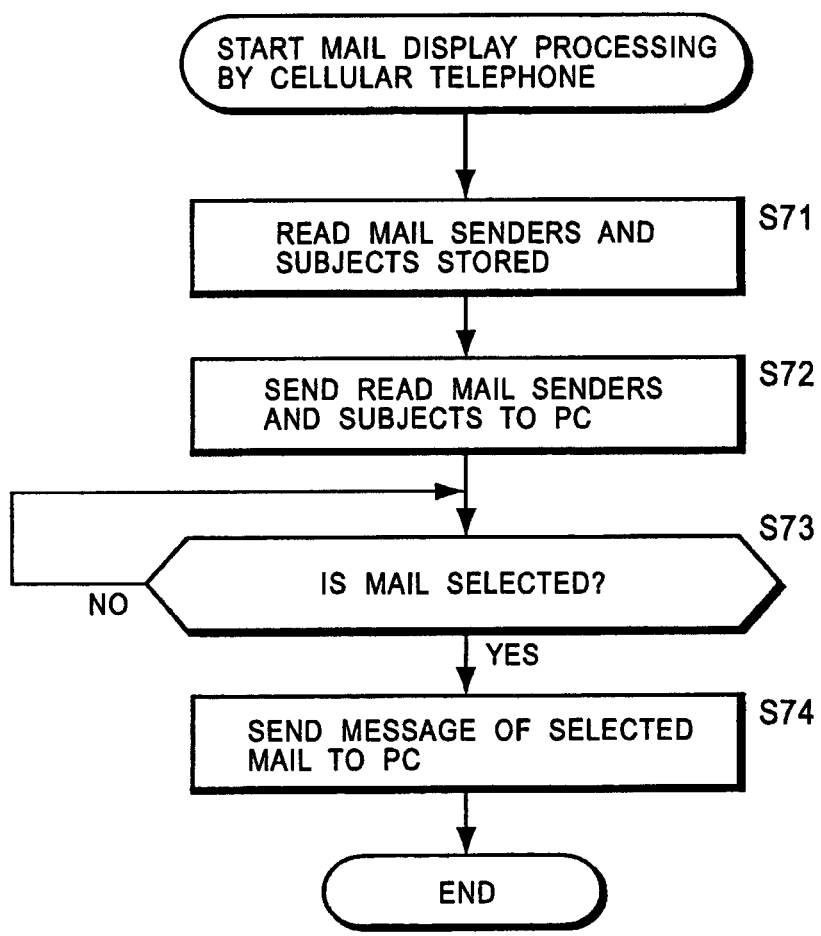
FIG. 14 is a flowchart illustrating the processing performed by the cellular telephone in the example shown in FIG. 13.

In step S71 of FIG. 14, the CPU 201 of the cellular telephone 11 reads the senders and the subjects of mail messages received so far and stored in the RAM 203. Then, in step S72, the CPU 201 allows the communication unit 213 to send the read senders and subjects of the mail messages to the personal computer 1. That is, in this case, the CPU 201 controls the communication unit 213 to send the senders and subjects of the mail messages to the personal computer 1 via Bluetooth communication.

The senders and subjects of the mail messages are displayed on the LCD 32 of the personal computer 1, as described below, and when the user selects a predetermined sender and subject, information concerning that selection is sent to the cellular telephone 11.

Then, in step S73, the CPU 201 waits until it is reported that the mail has been selected, and when it is reported that the mail has been selected, the process proceeds to step S74. In step S74, the mail message is read from the RAM 203 and is sent from the communication unit 213 to the personal computer 1.

Figure 15:
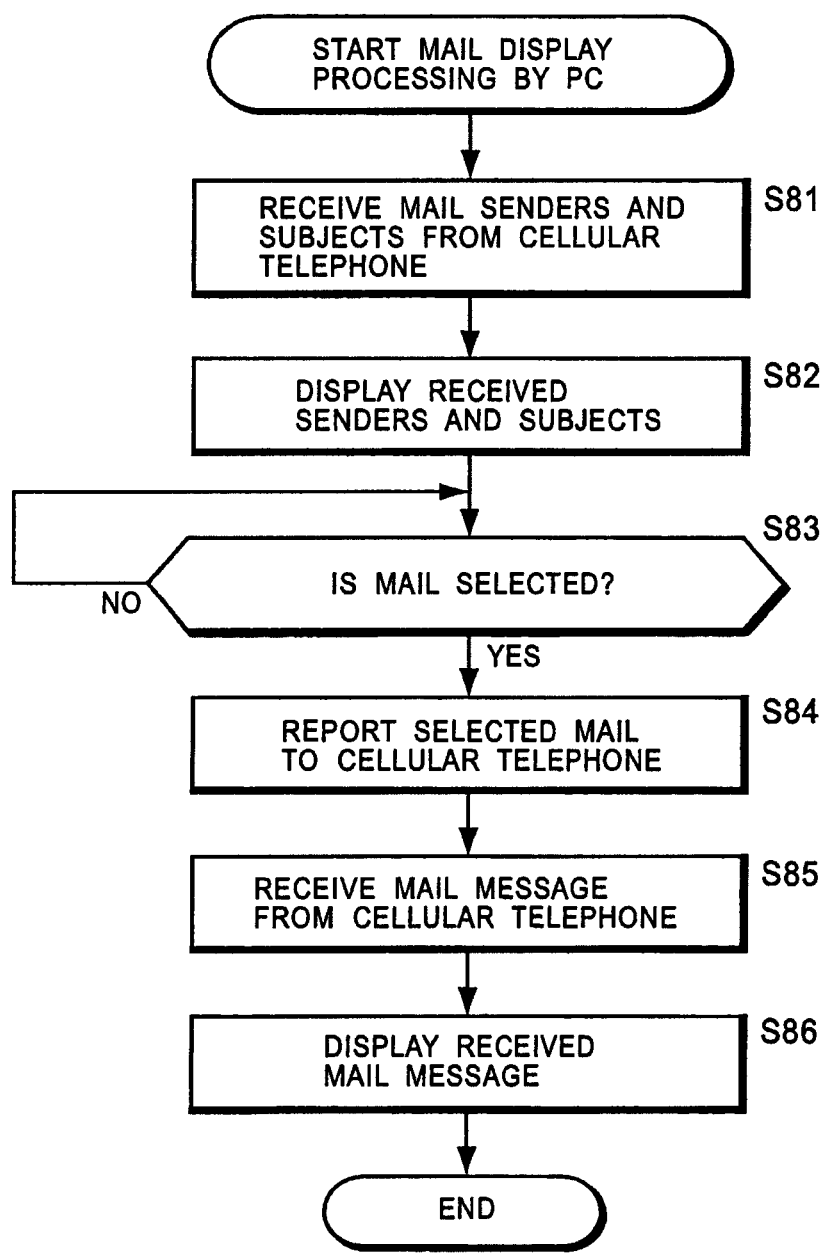
FIG. 15 is a flowchart illustrating the processing performed by the personal computer in the example shown in FIG. 13.

In accordance with the process of the cellular telephone 11, the personal computer 1 executes the process indicated by the flowchart of FIG. 15.

First, in step S81, the CPU 21 receives the mail senders and subjects from the cellular telephone 11. More specifically, the communication unit 28 receives the mail senders and subjects from the communication unit 213 of the cellular telephone 11 via Bluetooth communication, and supplies them to the RAM 23 and stores them therein.

In step S82, the CPU 21 reads the senders and subjects stored in the RAM 23, and outputs them to the LCD 32 and displays them. Accordingly, the mail senders and subjects sent from the cellular telephone 11 are displayed in a window 301, such as that shown in FIG. 13.

The user operates the pen by viewing this display and specifies the sender or the subject of one of the mail messages within the window 301 so as to select the mail. Then, in step S83, the CPU 21 waits until the mail is selected, and when the mail is selected, the process proceeds to step S84. In step S84, the CPU 21 informs the cellular telephone 11 of the selected mail. That is, in this case, the CPU 21 controls the communication unit 28 to inform the cellular telephone 11 which mail has been specified (selected) by the user via Bluetooth communication.

After informing the cellular telephone 11 of the selected mail, as stated above, the selected mail message is sent from the cellular telephone 11. Then, in step S85, the communication unit 28 receives the mail message sent from the cellular telephone 11. The mail message is temporarily supplied to the RAM 23 and is stored therein. Then, in step S86, the CPU 21 reads the mail message stored in the RAM 23, and outputs it to the right side of the position at which the cellular telephone 11 is placed on the LCD 32 or to a position specified by the user with the pen (such a position is detected from an output of the tablet 31) and displays the message. Accordingly, the selected mail message is displayed in the window 302, such as that shown in FIG. 13. In the example of FIG. 13, the message of the second mail (the sender is BBB and the subject is bb) in the window 301 is displayed as "Hello. It's a nice weather, isn't it?".

Theoretically, it is possible to send and receive mail data by communication between the RF tag 212 and the reader/writer 33. However, since the transmission capacity of this type of communication is small, the communication is limited to the sending of ID information in the present invention.

A display indicating the communication status in the information processing system of the present invention is described below.

Figure 16:
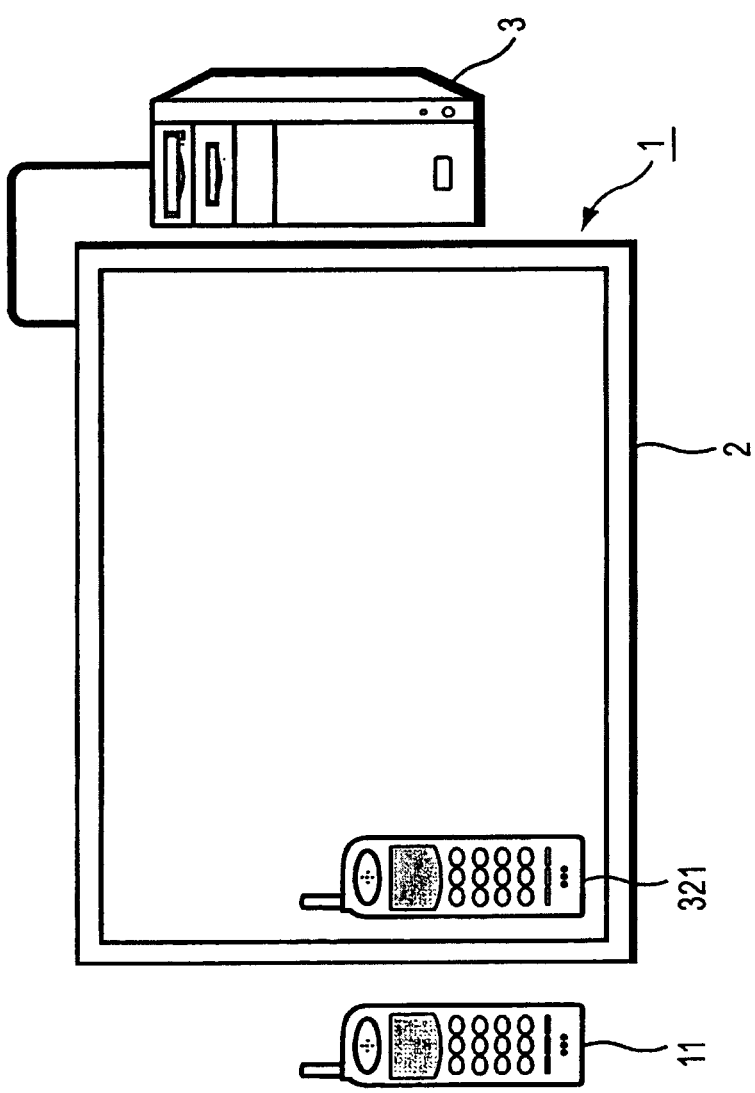
FIG. 16 illustrates an example of the display indicating the communication status.

FIGS. 16 through 18 illustrate a first example of the display indicating the communication status in the information processing system of the present invention. When the cellular telephone 11 is positioned in the proximity with the personal computer 1, as shown in FIG. 16, and when the electric field formed by the cellular telephone 11 is sufficiently strong at the position at which the personal computer 1 is disposed, the input level of the radio waves transmitted from the cellular telephone 11 and received by the communication unit 28 is sufficiently high.

When the input level of the radio waves transmitted from the cellular telephone 11 is equal to the maximum input, the personal computer 1 sets the level of transparency to be 0, and displays an image 321 corresponding to the cellular telephone 11 on the LCD 32 of the input display unit 2 so that the background image is not transmitted at all.

When the cellular telephone 11 is positioned in a mid-point of the communication range of the personal computer 1 (for example, the distance between the personal computer 1 and the cellular telephone 11 is about 5 m), as shown in FIG. 17, and when the input level of the radio waves transmitted from the cellular telephone 11 and received by the communication unit 28 is about one half the maximum input, the personal computer 1 sets the level of transparency to be, for example, 50%, and displays the image 321 corresponding to the cellular telephone 11 on the LCD 32 of the input display unit 2.

That is, the personal computer 1 adds, for example, ½ of the predetermined pixel values of the original image 321 to ½ of the pixel values of the background image, thereby calculating the values of a translucent image. The personal computer 1 then displays the translucent image 321 corresponding to the cellular telephone 11 on the LCD 32 of the input display unit 2 based on the calculated pixel values.

When the cellular telephone 11 is positioned at the end of the communication range of the personal computer 1 (for example, the distance between the personal computer 1 and the cellular telephone 11 is about 10 m), as shown in FIG. 18, and when the input level of the radio waves transmitted from the cellular telephone 11 and received by the communication unit 28 is about the same as the reception sensitivity, the personal computer 1 sets the level of transparency to be, for example, 90%, and displays the image 321 corresponding to the cellular telephone 11 on the LCD 32 of the input display unit 2.

That is, the personal computer 1 adds, for example, 10% of the pixel values of the original image 321 to 90% of the pixel values of the background image, thereby calculating the pixel values corresponding to the image 321. The personal computer 1 then displays the almost transparent image 321 corresponding to the cellular telephone 11 on the LCD 32 of the input display unit 2 based on the calculated pixel values.

Figure 19:
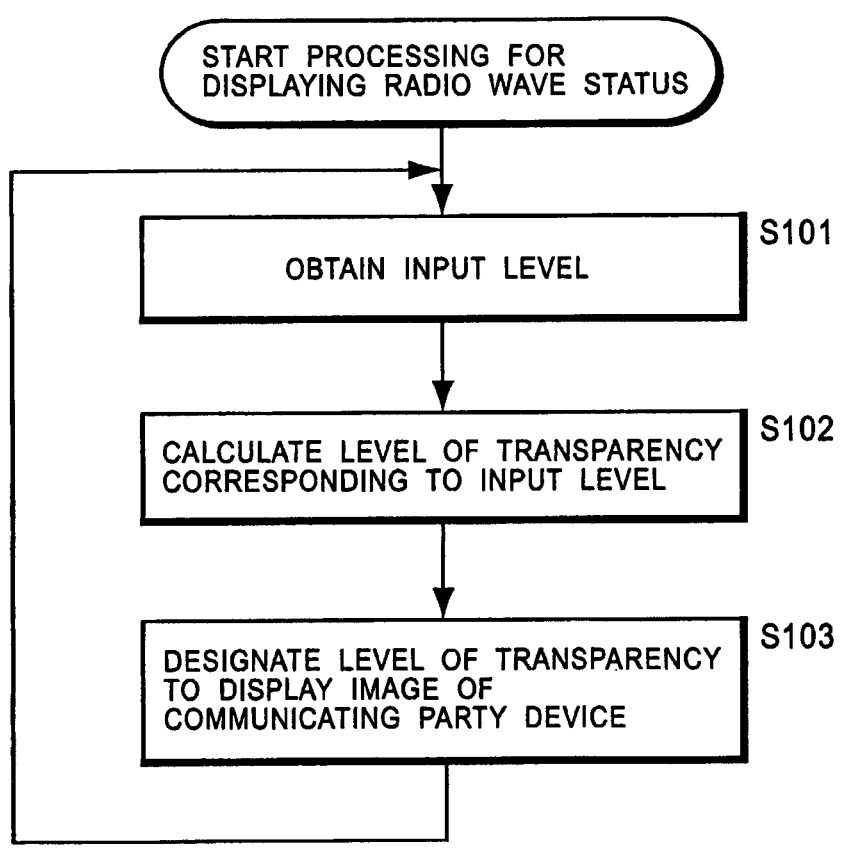
FIG. 19 is a flowchart illustrating the processing for displaying the radio wave status.

FIG. 19 is a flowchart illustrating a process of displaying the radio wave status by the personal computer 1.

In step S101, the CPU 121 of the communication unit 28 of the personal computer 1 obtains the input level of the radio waves received from the cellular telephone 11 from an RF unit 128 via the bus 125. The CPU 121 supplies data indicating the input level to the CPU 21 via the input/output interface 126 and the input/output interface 25.

In step S102, the CPU 21 of the personal computer 1, which executes the display control program 164, calculates the level of transparency corresponding to the input level based on the data indicating the radio waves. The CPU 21 calculates the level of transparency by, for example, dividing the obtained data indicating the input level by a predetermined constant.

The CPU 21 may determine the level of transparency by comparing the data indicating the input level with at least one prestored threshold. Alternatively, the CPU 21 may determine the level of transparency based on a table, which is prestored in the storage unit 26, in which the input levels and the levels of transparency are associated with each other.

In step S103, the CPU 21, which executes the display control program 164, designates the level of transparency calculated in the processing of step S102 so as to display the image of the device of the communicating party on the LCD 32 of the input display unit 2. The process then returns to step S101, and the display processing is repeated. If the communicating party is, for example, the cellular telephone 11, the CPU 21 designates the level of transparency calculated in the processing of step S102 so as to display the image 321 corresponding to the cellular telephone 11 on the LCD 32 of the input display unit 2.

As described above, the personal computer 1 is able to display the image of a communicating party on the input display unit 2 by varying the level of transparency in accordance with the radio wave status. Thus, the user is able to quickly understand the radio wave status, namely, the communication status.

The user can determine the position of the cellular telephone 11 so that the image having the lowest level of transparency is displayed on the input display unit 2, thereby making it possible to exchange information more reliably between the personal computer 1 and the cellular telephone 11.

Figure 20:
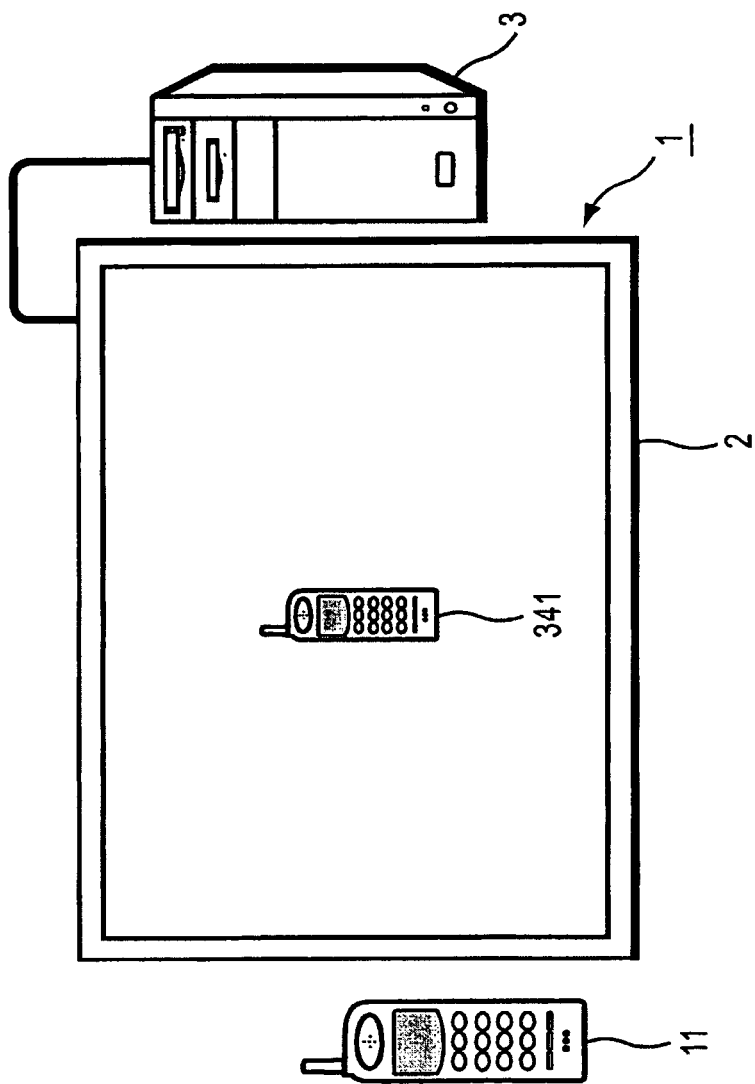
FIG. 20 illustrates an example of the display indicating the communication status.

FIGS. 20 through 22 illustrate a second example of the display indicating the communication status in the information processing system of the present invention. When the cellular telephone 11 is placed in proximity with the personal computer 1, as shown in FIG. 20, and when the input level of the radio waves transmitted from the cellular telephone 11 is equivalent to the maximum input, the personal computer 1 displays an image 341 corresponding to the cellular telephone 11 at the center of the LCD 32 of the input display unit 2.

When the cellular telephone 11 is positioned at a mid-point of the communication range of the personal computer 1, as shown in FIG. 21, and when the input level of the radio waves transmitted from the cellular telephone 11 and received by the communication unit 28 is about one half the maximum input, the personal computer 1 displays the image 341 corresponding to the cellular telephone 11, for example, on a diagonal line of the display surface of the LCD 32 at which the distance from the image 341 to the center of the LCD 32 and the distance from the image 341 to the corner of the LCD 32 are the same.

When the cellular telephone 11 is positioned at the end of the communication range of the personal computer 1, as shown in FIG. 22, and when the input level of the radio waves transmitted from the cellular telephone 11 and received by the communication unit 28 is almost equal to the reception sensitivity, the personal computer 1 displays the image 341 corresponding to the cellular telephone 11 at the corner of the LCD 32 of the input display unit 2.

Figure 23:
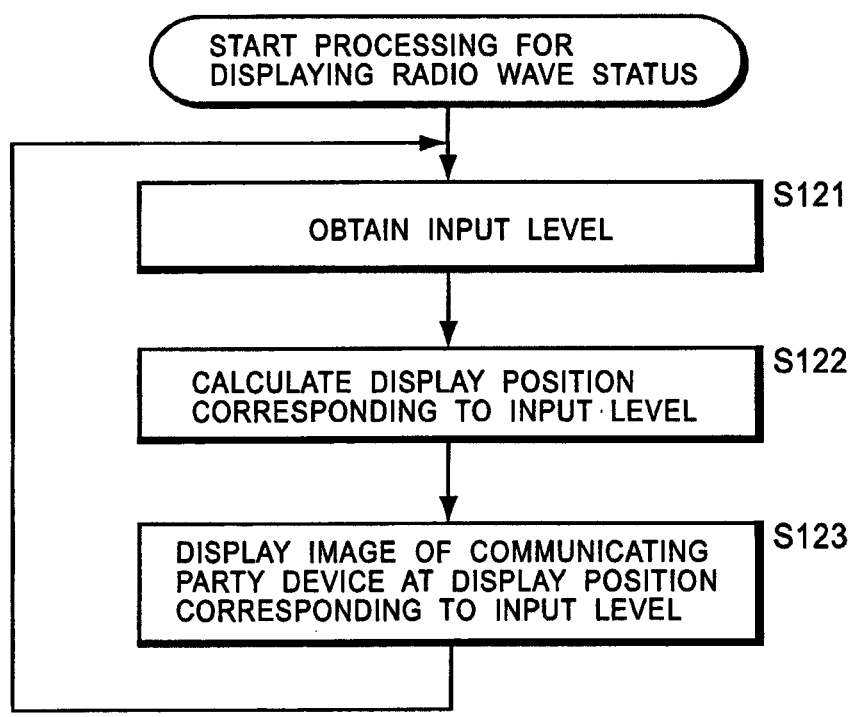
FIG. 23 is a flowchart illustrating the processing for displaying the radio wave status.

FIG. 23 is a flowchart illustrating another process of displaying the radio wave status by the personal computer 1.

In step S121, the CPU 121 of the communication unit 28 of the personal computer 1 obtains the input level of the radio waves received from the cellular telephone 11 from the RF unit 128 via the bus 125. The CPU 121 then supplies data indicating the input level to the CPU 21 via the input/output interface 126 and the input/output interface 25.

In step S122, the CPU 21 of the personal computer 1, which executes the display control program 164, calculates the display position based on the data indicating the input level of the radio waves. For example, when the input level of the radio waves is higher, the CPU 21 calculates coordinates closer to the center of the LCD 32 on a diagonal line of the display surface of the LCD 32. When the input level of the radio waves is lower, the CPU 21 calculates coordinates closer to the corner of the LCD 32 on a diagonal line of the display surface of the LCD 32.

In step S123, the CPU 21, which executes the display control program 164, designates the display position corresponding to the input level calculated in the processing of step S122 so as to display the image of the device of the communicating party. The process then returns to step S121, and the display processing is repeated. If the communicating party is, for example, the cellular telephone 11, the CPU 21 designates the display position calculated in the processing of step S122 so as to display the image 341 corresponding to the cellular telephone 11 on the LCD 32 of the input display unit 2.

As described above, the personal computer 1 is able to display the image of a communicating party on the input display unit 2 by varying the position in accordance with the radio wave status. Then, the user is able to quickly understand the radio wave status, namely, the communication status.

The user can determine the position of the cellular telephone 11 so that the image is displayed at a position closer to the center of the input display unit 2, thereby making it possible to exchange information more reliably between, the personal computer 1 and the cellular telephone 11.

The personal computer 1 may display the image of a communicating party on the input display unit 2 by changing the size of the image in accordance with the radio wave status. For example, when the input level of the radio waves transmitted from the cellular telephone 11 is higher, the personal computer 1 may display a larger image of the communicating party on the input display unit 2. When the input level of the radio waves transmitted from the cellular telephone 11 is lower, the personal computer 1 may display a smaller image of the communicating party on the input display unit 2.

Alternatively, the personal computer 1 may perform mosaic processing corresponding to the radio wave status on the image of a communicating party so as to display the image subjected to mosaic processing on the input display unit 2. For example, when the input level of the radio waves transmitted from the cellular telephone 11 is sufficiently high, the personal computer 1 displays a sharp image of the communicating party on the input display unit 2. When the input level of radio waves transmitted from the cellular telephone 11 is low, the personal computer 1 displays a mosaic-processed image of the communicating party on the input display unit 2. The personal computer 1 varies the level of mosaic processing performed on the image of the communicating party in accordance with the input level of the radio waves transmitted from the cellular telephone 11.

Alternatively, the personal computer 1 may display the image of a communicating party on the input display unit 2 by changing the color of the image in accordance with the radio wave status. For example, when the input level of the radio waves transmitted from the cellular telephone 11 is higher, the personal computer 1 displays a higher saturation image (a so-called sharp image) of the communicating party on the input display unit 2. When the input level of the radio waves transmitted from the cellular telephone 11 is lower, the personal computer 1 displays a lower saturation image (a so-called faint image) of the communicating party on the input display unit 2. The personal computer 1 may display the image of a communicating party on the input display unit 2 by changing the color density, the color hue, or the luminance of the image in accordance with the radio wave status.

Alternatively, the personal computer 1 may display the image of a communicating party on the input display unit 2 by changing the spatial resolution of the image in accordance with the radio wave status. For example, when the input level of the radio waves transmitted from the cellular telephone 11 is higher, the personal computer 1 may display an image containing more high-frequency components of the communicating party on the input display unit 2. When the input level of the radio waves transmitted from the cellular telephone 11 is lower, the personal computer 1 may display an image containing less high-frequency components (a so-called blurred image) of the communicating party on the input display unit 2.

The personal computer 1 may display on the input display unit 2 an image obtained by changing the level of transparency, the size, the saturation, etc. in a mixed manner in accordance with the radio wave status.

It has been described that the personal computer 1 displays the image corresponding to the input level of the radio waves received by the communication unit 28 on the input display unit 2. However, the personal computer 1 may display the image corresponding to the intensity of electromagnetic coupling between the reader/writer 33 and the RF tag 212 on the input display unit 2.

The ID number is sent and received between the RF tag and the reader/writer. Alternatively, a barcode may be printed on each electronic device, and the ID number can be sent and received by reading the barcode.

Although Bluetooth is used as a network by way of example, a telephone line, a LAN, a wireless LAN, a WAN, the Internet, etc., may be used.

As the information processing apparatus on which an electronic device is placed, not only an input display unit, but also a palm rest, a mouse pad, or a white board of a notebook personal computer may be used.

It has been described that the telephone number is used as the ID number by way of example. However, any number may be used as long as it is required for accessing the electronic device in the network.

Authentication for a communicating party may be performed when sending and receiving the ID number.

The terminal of a communicating party performing Bluetooth communication is specified based on the ID or the name of the Bluetooth device stored in the RF tag 212 of the cellular telephone 11. However, even if the RF tag 212 is not provided for the cellular telephone 11, the terminal of the communicating party can be specified by controlling the output power of the radio waves of the communication unit 213, which serves as a wireless module (Bluetooth module).

A description is now given of a communication system in which the terminal of a communicating party can be specified by controlling the output power of radio waves output from a wireless module.

Figure 24:
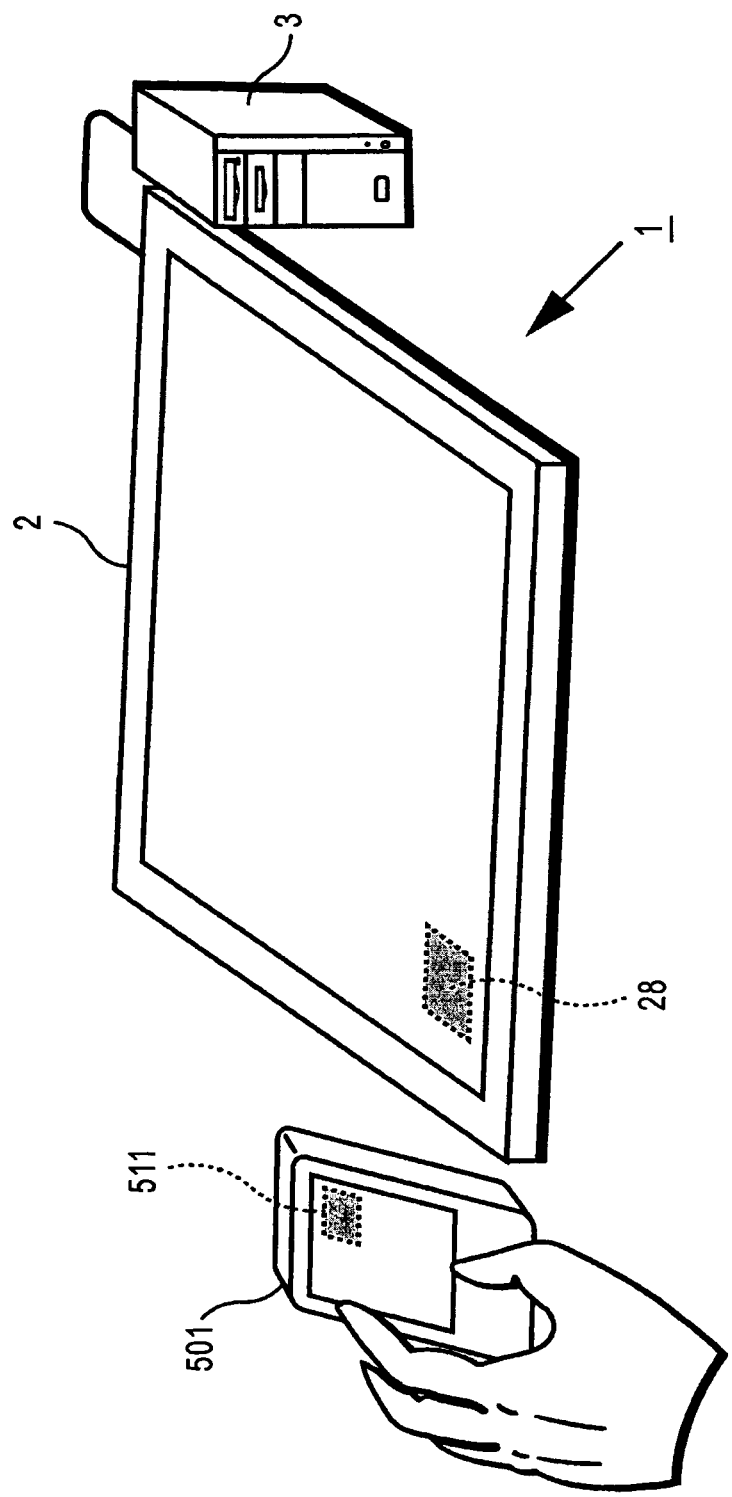
FIG. 24 illustrates an example of the configuration of a communication system to which the present invention is applied.

FIG. 24 is a diagram illustrating an example of the configuration of the communication system in which the terminal of a communicating party can be specified by controlling the output power of radio waves.

In this example, although a description is given of communication between the personal computer 1 and a PDA 501, the same operation can be performed when the cellular telephone 11 is used instead of the PDA 501.

For example, when a communicating party performing Bluetooth communication is specified to establish communication with that communicating party, the PDA 501 first restricts the output power of a communication module 511 to a minimal level so that radio waves reach only within a range of a few centimeters. In the extremely small power mode in which the output power of radio waves is restricted as described above, the communication module 511 repeatedly performs "inquiry" to search for devices positioned in a range that can be reached by the radio waves (for example, within a range of a few centimeters).

When the user places or positions the PDA 501 on or in proximity with the personal computer 1 so that the radio waves radiated from the communication module 511 are received by the communication unit 28 (wireless module) of the personal computer 1, the communication unit 28 responds to the inquiry. Thus, the communication module 511 performs inquiry and paging with the communication unit 28, as stated above, so as to establish a communication link. This communication link is effective only within a very narrow area that can be reached by radio waves from the communication module 511 in which the extremely low power mode is set.

Accordingly, the communication module 511 temporarily disconnects the communication link so as to switch the power mode of the communication module 511 from the extremely low power mode to the normal power mode so that communication can be performed with the communication unit 28 even if the PDA 501 is away from the personal computer 1 at a certain distance. Then, the communication module 511 reestablishes the communication link with the communication unit 28 based on the information obtained (the information obtained by inquiry and paging in short-distance communication).

The reestablished communication link becomes effective within a range of a few dozen of meters that can be reached by radio waves in a manner similar to normal Bluetooth communication, and Bluetooth communication can be performed even when the distance between the personal computer 1 and the PDA 501 is sufficiently wide.

As described above, even when an RF tag in which the ID or the name of a Bluetooth device is stored is not provided for the PDA 501, the output power of the communication module is controlled, and then, the user merely places the PDA 501 in proximity with the personal computer 1 to establish Bluetooth communication.

If the power mode of the communication module 511 can be seamlessly switched, it may be switched from the extremely low power mode to the normal power mode without temporarily disconnecting the communication link established when the extremely low power mode is set.

Figure 25:
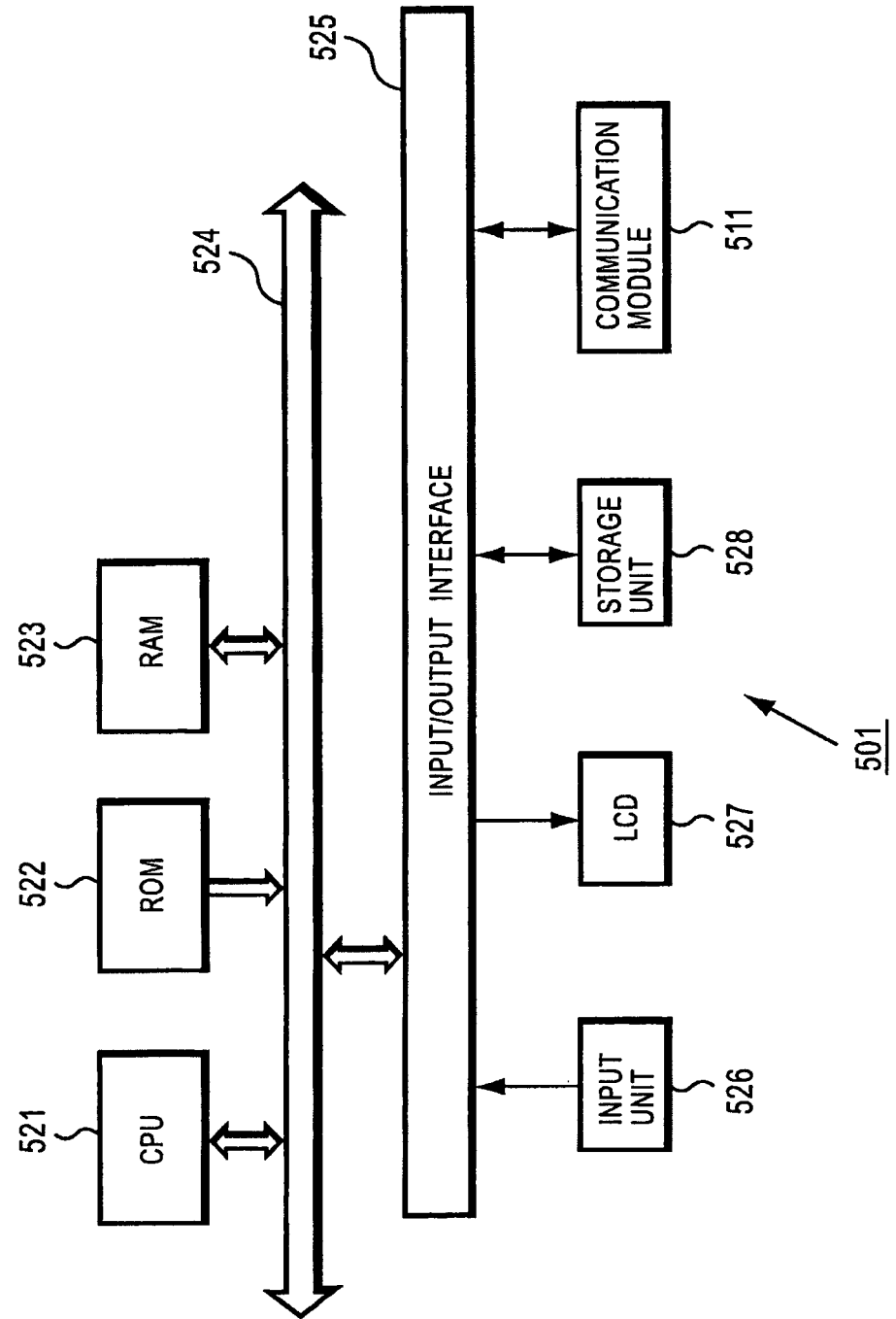
FIG. 25 is a block diagram illustrating an example of the configuration of a PDA shown in FIG. 24.

FIG. 25 is a block diagram illustrating an example of the configuration of the PDA 501 shown in FIG. 24.

The configuration of the PDA 501 is basically similar to that of the cellular telephone 11 shown in FIG. 6, except that the communication unit 209 (a communication module that performs communication via a telephone line), the microphone 210, the speaker 211, and the RF tag 212 are not provided, and an explanation thereof is thus omitted.

A CPU 521 controls the overall operation of the PDA 501 according to, for example, a program expanded from a ROM 522 into a RAM 523, and controls the output power of radio waves transmitted from the communication module 511 according to the communication status, as described above.

Figure 26:
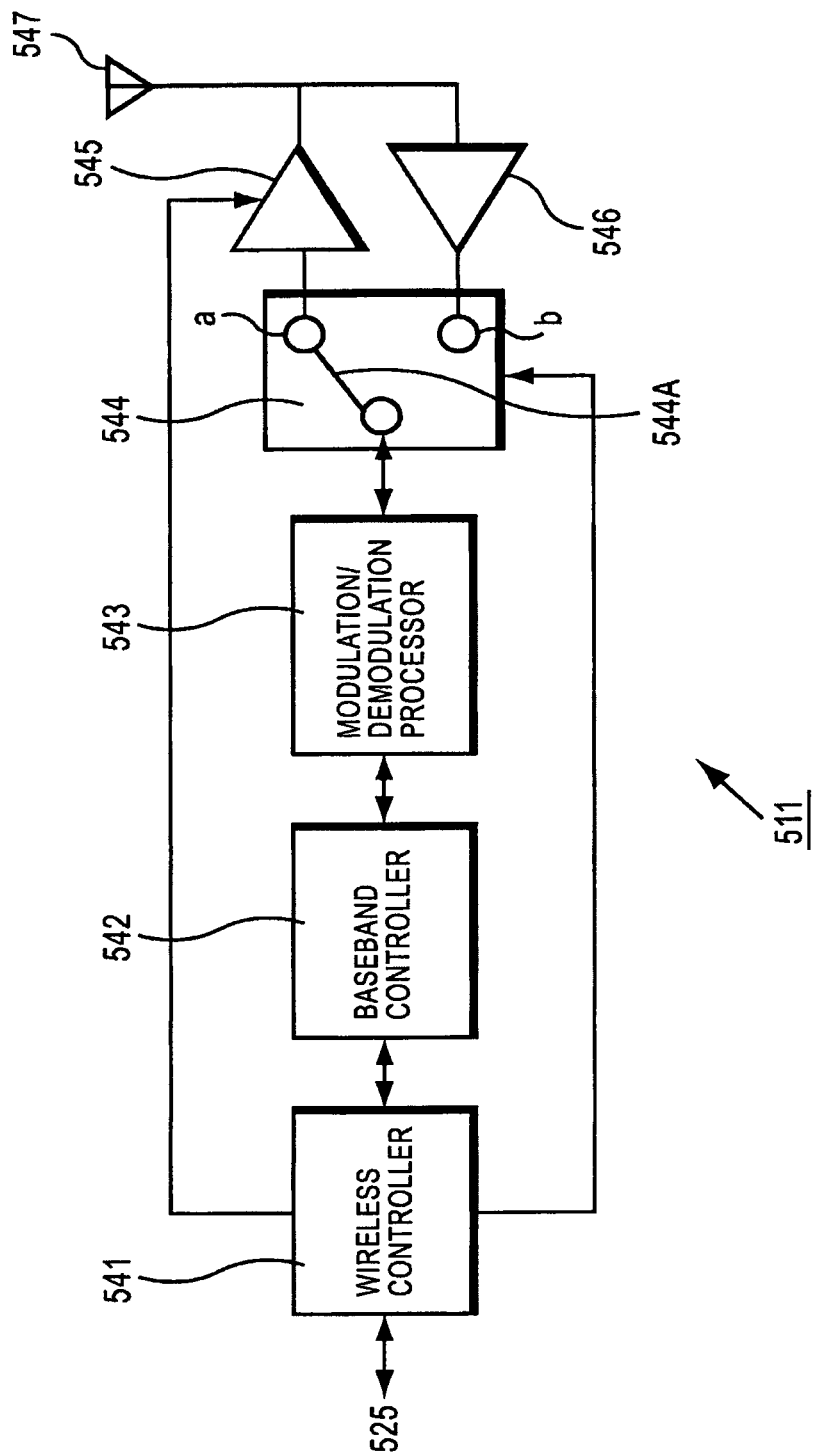
FIG. 26 is a block diagram illustrating an example of a wireless module shown in FIG. 25.

FIG. 26 is a block diagram illustrating an example of a detailed configuration of the communication module 511 shown in FIG. 25.

The communication module 511 can be a Bluetooth module or a wireless LAN module, and if it serves as a Bluetooth module, the configuration thereof encompasses the configuration of the communication unit 28 shown in FIG. 4. The configuration of the communication module (Bluetooth module) 511 in FIG. 26 is shown in a simplified form compared to that shown in FIG. 4 so as to avoid the repetition of the same explanation.

A wireless controller 541 controls a changeover switch 544. When sending information to an external terminal from the communication module 511, the wireless controller 541 connects a switch 544A to a contact a. When receiving information from an external terminal, the wireless controller 541 connects the switch 544A to a contact b. Based on the control performed by the CPU 521 via the bus 524 and the input/output interface 525, the wireless controller 541 controls the gain of a power amplifier 545 so as to regulate the range (output power) that can be reached by radio waves radiated from an antenna 547.

More specifically, when an instruction is given from the CPU 521 to set the extremely low power mode, the wireless controller 541 controls the gain of the power amplifier 545 so that the range that can be reached by radio waves radiated from the antenna 547 is restricted to a minimal level. In contrast, when an instruction is given from the CPU 521 to switch from the extremely low power mode to the normal power mode after specifying the terminal of a communicating party, the wireless controller 541 controls the gain of the power amplifier 545 so that the range that can be reached by radio waves becomes wider.

As in the baseband controller 127 shown in FIG. 4, a baseband controller 542 controls the baseband signal of transmission/reception signals. A modulation/demodulation processor 543 performs GFSK modulation and spread spectrum based on the hopping frequency on the output from the baseband controller 542, and outputs the resulting signal from the antenna 547 via the power amplifier 545. The modulation/demodulation processor 543 also performs inverse spread spectrum and GFSK demodulation on the output from an LNA (Low Noise Amplifier), and outputs the resulting signal to the baseband controller 542.

The configuration of the personal computer 1 is similar to the configuration shown in FIG. 2, and an explanation thereof is thus omitted. In the communication system shown in FIG. 24, it is not necessary that the reader/writer 33 shown in FIG. 2 be provided for the personal computer 1.

Figure 27:
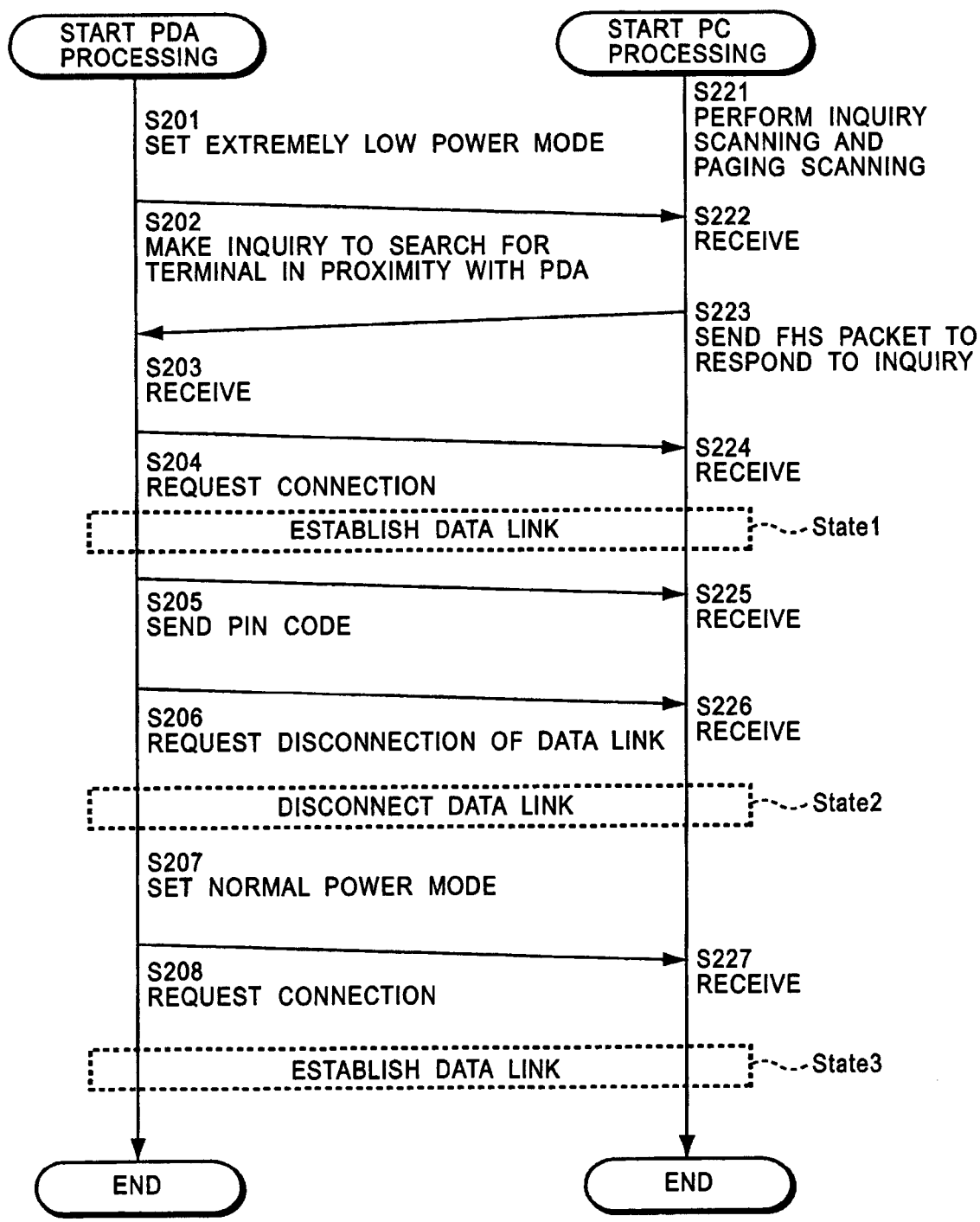
FIG. 27 is a flowchart illustrating the operation of the communication system shown in FIG. 24.

The operation of the communication system shown in FIG. 24 is described below with reference to the flowchart of FIG. 27. In this example, it is assumed that a communicating party performing Bluetooth communication is specified to establish communication.

For example, when an instruction is given from the user to perform Bluetooth communication, the communication module 511 is started under the control of the CPU 521. In step S201, the extremely low power mode is set as the power mode of the communication module 511. The communication module 511 then proceeds to step S202 in which it repeatedly performs inquiry to search for a terminal placed in proximity with the PDA 501. Since the extremely low power mode is set to limit the range that can be reached by radio waves to a minimal level, during the inquiry performed in step S202, an IQ packet (inquiry packet) is repeatedly broadcast in a range of a few centimeters from the antenna 547.

Meanwhile, in step S211, the communication unit 28 of the personal computer 1 repeatedly performs inquiry scanning and paging scanning, and waits for an inquiry or paging request from another terminal.

When the user places the PDA 501 in proximity with the personal computer 1, and when the communication unit 28 of the personal computer 1 is within the range that can be reached by radio waves from the communication module 511 of the PDA 501, an IQ packet broadcast from the communication module 511 is received by the communication unit 28 in step S222.

Upon receiving the IQ packet broadcast from the communication module 511, the communication unit 28 proceeds to step S223 to respond to the IQ packet. In step S223, the communication unit 28 sends an FHS packet to the communication module 511. This FHS packet contains information indicating the Bluetooth address and the Bluetooth clock of the personal computer 1 as attribute information of the personal computer 1 (Bluetooth slave).

Upon receiving the FHS packet sent from the communication unit 28 in step S203, the communication module 511 proceeds to step S204 in which the communication module 511 requests the communication unit 28 to connect to the communication module 511.

More specifically, when the ID packet is sent from the communication module 511 to the communication unit 28, and when the same ID packet as the ID packet sent from the communication module 511 is returned from the communication unit 28 to the communication module 511, an FHS packet containing the Bluetooth address and the Bluetooth clock of the communication module 511 is sent from the communication module 511 to the communication unit 28.

When receiving the FHS packet sent from the communication module 511 by the communication unit 28 in step S224, synchronization in the frequency domain (frequency hopping pattern) and in the time domain (time slot) is established between the communication module 511 and the communication unit 28, thereby entering the state in which a data link (communication link) is established (state 1).

For example, when a data link is first established between the communication unit 28 and the communication module 511 by Bluetooth, in step S205, the communication module 511 sends a PIN (Personal Identification Number) code to the communication unit 28 so as to authenticate each other. The PIN code sent from the communication module 511 is received by the communication unit 28 in step S225, and then, various link keys are set between the communication module and the communication unit 28 based on the PIN code, random numbers, etc. The PIN code may be encrypted before being sent and received by using a public key provided for the communication module 511 by the communication unit 28. That is, in this case, the communication unit 28 manages the private key associated with the public key provided for the communication module 511. Accordingly, the security can be enhanced, thereby making it possible to perform Bluetooth communication more reliably only between the personal computer 1 and the PDA 501.

The communication link established as described above is effective only in a range of a few centimeters that can be reached by radio waves radiated from the communication module 511 in which the extremely low power mode is set. Accordingly, in step S206, the communication module 511 requests the communication unit 28 to temporarily disconnect the data link so as to switch the power mode so that the communication module 511 can communicate with the communication unit 28 even if it is away from the communication unit 28 at a certain distance. In this case, the information obtained so far, that is, the Bluetooth address, PIN code, etc., of the communication unit 28, is stored in the communication module 511.

Upon receiving this request in step S226, as in the communication module 511, the communication unit 28 stores the information obtained so far, i.e., the Bluetooth address, PIN code, etc., of the communication module 511, and disconnects the data link (state 2).

In step S207, the communication module 511 sets the power mode that controls the output power to the normal power mode under the control of the CPU 521 so as to reestablish a data link with the communication unit 28. Accordingly, Bluetooth radio waves from the communication module 511 can reach up to, for example, a range of a few dozen of meters.

The communication module 511 then proceeds to step S208. In step S208, the communication module 511 specifies the personal computer 1 as the terminal of the communicating party based on the information stored immediately before the data link is disconnected, and requests the communication unit 28 to connect to the communication module 511.

This request is received by the communication unit 28 in step S227, and the settings are made in both the terminals so as to establish the data link between the communication module 511 and the communication unit 28. That is, in this state, Bluetooth communication can be performed, for example, within a range of a few dozen of meters that can be reached by radio waves radiated from the communication module 511 in which the normal power mode is set (state 3).

The communication system shown in FIG. 24 in which a closely placed terminal can be specified as the terminal of a communicating party is applied to the information processing system formed of the personal computer 1 and the cellular telephone 11 shown in FIG. 1. Then, in this information processing system, the image indicating the closely placed terminal can be displayed on the LCD 32 of the personal computer 1 in accordance with the distance between the terminal of the communicating party and the personal computer 1. That is, the user is able to recognize the communication distance at which the terminals can be connected, thereby making it possible to reliably perform communication between the terminals.

A set of the above-described processes can be executed by using software. In this case, a corresponding software program is installed into a computer built in dedicated hardware or a computer that can execute various functions by installing various programs, for example, a general-purpose computer, via a network or a recording medium.

This recording medium may be formed of a package medium recording the program therein, which is distributed to the user for providing the program separately from the computer, as shown in FIG. 2, consisting of the magnetic disk 41 (including a floppy disk (registered)), the optical disc 42 (including a CD-ROM (Compact Disc-Read Only Memory) and a DVD (Digital Versatile Disc)), the magneto-optical disk 43 (including an MD (Mini-Disc (registered)), or the semiconductor memory 43. Alternatively, the recording medium may be formed of the ROM 22 recording the program therein or a hard disk contained in the storage unit 26, which is provided to the user while being built in the computer.

The steps forming the program recorded in the recording medium encompass operations executed in chronological order described in this specification. The steps also encompass operations concurrently or individually performed.

In this specification, the system represents the entire apparatus consisting of a plurality of devices.

INDUSTRIAL APPLICABILITY

As described above, according to the present invention, communication can be performed with an electronic device via radio waves, and the display of an image corresponding to the electronic device is controlled based on the input level of the radio waves transmitted from the electronic device, thereby making it possible to recognize the communication distance at which the information processing apparatus and the electronic device can be connected. Thus, information can be reliably exchanged between the information processing apparatus and the electronic device.

The invention claimed is:

1. An information processing apparatus, comprising:
a processing circuitry to:
communicate with an electronic device via radio wave;
obtain identification information concerning the electronic device via the radio wave;
specify an image based on the obtained identification information; and
calculate a display position of the image to be displayed based on a status of the radio wave,
wherein the image is obtained by changing at least two of a level of transparency, a size, a color, a resolution, a level of saturation, or mosaic processing in a mixed manner in accordance with the status of the radio wave.

2. The information processing apparatus according to claim 1, wherein the image corresponds to the configuration of the electronic device.

3. The information processing apparatus according to claim 1, wherein the processing circuitry controls the image to be displayed with a level of transparency corresponding to the status of the radio wave.

4. The information processing apparatus according to claim 1, wherein the processing circuitry controls the image to be displayed with a size corresponding to the status of the radio wave.

5. The information processing apparatus according to claim 1, wherein the processing circuitry controls the image to be displayed with a color corresponding to the status of the radio wave.

6. The information processing apparatus according to claim 1, wherein the processing circuitry controls the image to be displayed with a level of resolution corresponding to the status of the radio wave.

7. The information processing apparatus according to claim 1, wherein the processing circuitry controls the image to be displayed with a level of saturation corresponding to the status of the radio wave.

8. The information processing apparatus according to claim 1, wherein the processing circuitry controls the image to be displayed by performing mosaic processing on the image in accordance with the status of the radio wave.

9. The information processing apparatus according to claim 1, further comprising: a display unit to display the image on a position corresponding to the display position.

10. An information processing method, comprising:
communicating with an electronic device via radio wave;
obtaining identification information concerning the electronic device via the radio wave;
specifying an image based on the obtained identification information; and
calculating a display position of the image to be displayed based on a status of the radio wave,
wherein the image is obtained by changing at least two of a level of transparency, a size, a color, a resolution, a level of saturation, or mosaic processing in a mixed manner in accordance with the status of the radio wave.

11. The information processing method according to claim 10, wherein the image corresponds to the configuration of the electronic device.

12. The information processing method according to claim 10, further comprising: displaying the image with a level of transparency corresponding to the status of the radio wave.

13. The information processing method according to claim 10, further comprising: displaying the image with a size corresponding to the status of the radio wave.

14. The information processing method according to claim 10, further comprising: displaying the image with a color corresponding to the status of the radio wave.

15. The information processing method according to claim 10, further comprising: displaying the image with a level of resolution corresponding to the status of the radio wave.

16. The information processing method according to claim 10, further comprising: displaying the image with a level of saturation corresponding to the status of the radio wave.

17. The information processing method according to claim 10, further comprising: performing mosaic processing on the image in accordance with the status of the radio wave.

18. The information processing method according to claim 10, further comprising: displaying the image on a position corresponding to the display position.

* * * * *